(12) United States Patent
Garcia Luna et al.

(10) Patent No.: US 7,537,653 B2
(45) Date of Patent: May 26, 2009

(54) MICROSILICA MATERIALS WITH IMPROVED POZZOLANIC ACTIVITY

(75) Inventors: Armando Garcia Luna, Monterrey (MX); Jaime Valenzuela Grado, Chihuahua (MX)

(73) Assignee: GCC Technology and Processes S.A., Lausanne (CH)

( * ) Notice: Subject to any disclaimer, the term of this patent is extended or adjusted under 35 U.S.C. 154(b) by 75 days.

(21) Appl. No.: 10/599,441

(22) PCT Filed: Jul. 6, 2005

(86) PCT No.: PCT/IB2005/002161

§ 371 (c)(1),
(2), (4) Date: Sep. 28, 2006

(87) PCT Pub. No.: WO2006/079875

PCT Pub. Date: Aug. 3, 2005

(65) Prior Publication Data

US 2007/0209554 A1   Sep. 13, 2007
US 2009/0064899 A9   Mar. 12, 2009

(30) Foreign Application Priority Data

Jan. 31, 2005   (MX) .................. PA/A/2005/001211

(51) Int. Cl.
*C01B 33/18* (2006.01)
*C01B 33/12* (2006.01)
*C04B 14/04* (2006.01)

(52) U.S. Cl. .................. 106/482; 106/287.34; 423/335

(58) Field of Classification Search ............ 106/287.34, 106/482; 423/335
See application file for complete search history.

(56) References Cited

U.S. PATENT DOCUMENTS

| 2,965,448 | A | * | 12/1960 | Hoover ................. 423/335 |
| 3,135,617 | A | | 6/1964 | Newell et al. |
| 3,326,704 | A | * | 6/1967 | Scott et al. .................. 501/128 |
| 3,953,222 | A | | 4/1976 | Bainton |
| 4,234,347 | A | | 11/1980 | Kirilishin |
| 5,028,267 | A | | 7/1991 | Lane et al. |
| 5,176,752 | A | * | 1/1993 | Scheiner ................ 106/737 |
| 5,554,352 | A | | 9/1996 | Jaques et al. |
| 5,762,701 | A | | 6/1998 | Biagini et al. |
| 6,395,807 | B1 | | 5/2002 | Kinose et al. |
| 6,478,868 | B1 | | 11/2002 | Reddy et al. |
| 6,596,250 | B2 | | 7/2003 | Greenwood et al. |
| 6,696,035 | B2 | * | 2/2004 | Dastol et al. ................ 423/337 |
| 2002/0033120 | A1 | | 3/2002 | Berardi et al. |

FOREIGN PATENT DOCUMENTS

| DE | 3938730 A1 | 5/1991 |
| EP | 0246181 A1 | 11/1987 |
| EP | 1176124 A1 | 1/2002 |
| GB | 674240 | 6/1952 |
| GB | 686876 | 2/1953 |
| GB | 1225629 | 3/1971 |
| JP | 6-345528 A * | 12/1994 |
| JP | 2001003034 | 1/2001 |
| JP | 2005-231973 A * | 9/2005 |
| RO | 96824 | 4/1989 |
| WO | 90/11977 A1 | 10/1990 |
| WO | 91/06513 A1 | 5/1991 |
| WO | WO91/08168 A1 * | 6/1991 |
| WO | 94/18121 A1 | 8/1994 |
| WO | 97/38949 A1 | 10/1997 |
| WO | 98/12149 A1 | 3/1998 |
| WO | 00/51939 A1 | 9/2000 |
| WO | 2004/005189 A1 | 1/2004 |

OTHER PUBLICATIONS

Chandrasekhar et al., "Microsilica from rice husk as a possible substitute for condensed silica fume for high performance concentrate", Journal of Materials Science Letters, 2002, vol. 21, pp. 1245-1247, XP1125458.
"Microsilica 600-A Natural Pozzolan", General, Version 1, Microsilica NZ, 4 pages.
"Microsilica 600 for Shotcrete", Shotcrete, Version 1, Microsilica NZ, 3 pages.

* cited by examiner

*Primary Examiner*—Anthony J Green
(74) *Attorney, Agent, or Firm*—Rothwell, Figg, Ernst & Manbeck, P.C.

(57) ABSTRACT

A new pozzolanic material basically conformed of microsilica with a minimum of silica of 85% in its composition is described, where the silica of the material is conformed mainly of cristobalite and tridimite. Unlike microsilica conformed basically of quartz, the microsilica of the invention exhibits greater pozzolanic indexes and provides improved characteristics of durability to concrete cements and in smaller proportions. Also simple and low consumption energy methods for obtaining the pozzolanic material of the invention are described.

9 Claims, 21 Drawing Sheets

MICROSILICA MATERIALS WITH IMPROVED POZZOLANIC ACTIVITY

CROSS REFERENCE TO RELATED APPLICATION

This application is a 35 U.S.C. § 371 National Phase Entry Application from PCT/IB2005/002161, filed Jul. 6, 2005, and designating the United States.

BACKGROUND OF THE INVENTION

1. Field of the Invention

The actual invention is related to the field of the development of pozzolanic materials for construction, specifically to microsilicas that exhibit high pozzolanic indexes and methods for their obtaining.

2. Description of the Related Art

The Portland cement is one of the most important materials in the construction industry due to its multiple applications and its advisable physical and chemical characteristics that present. Nevertheless, the costs associated to their obtaining as well as the high amounts that they must be produced to cover the necessities of cement for construction, have been important factors for the generation of new materials that allow to replace part of the cement used for the manufacture of concrete or products derived from concrete, without causing a decrement in their mechanical properties and resistance.

In this sense the pozzolanic materials have taken great relevance due to their capacity to interact with the cement components and to improve its properties.

The pozzolans are siliceous or silico-aluminous materials that in themselves have little or no cementitious value but, in finely divided form and in the presence of moisture, chemically react with calcium hydroxide at ordinary temperature to generate compounds possessing cementitious properties.

The application of the pozzolans in concrete allows to increase its durability in function of the increase in its diverse properties, such as impermeability, resistance to sulphate attack, handling, mechanical resistance in advanced ages and reduction in the alkali aggregate reactivity among others; these generates minor cement consumptions and the obtaining of construction materials with better mechanical properties and durability. With the application of such pozzolanic materials the consumption of energy for the manufacture of concrete and cement with improved properties is diminished.

The synthetic pozzolans, generated like byproducts from diverse industrial processes, have quickly become the primary source of artificial pozzolans used at the moment. The electrical power stations using rice husks or coal as fuel, and metallurgical furnaces producing iron, silicon and ferrosilicon alloys are the main source of artificial pozzolans like fly ashes, rice husk ash, blast furnace slag, silica fume, etc.

The silica fume, well-known like volatilized silica or condensed silica fume, is manufactured by electric arc furnaces as a byproduct of the production of metallic silicon or ferrosilicon alloys. In the transformation of quartz to silicon at temperatures of around 2,000° C., the gaseous SiO oxidizes to $SiO_2$ and condenses in the form of special fine particles consisting of amorphous silica. The silica fume is removed by filtration of salient gases in filter devices.

The pozzolanic activity of the silica fume, based on its chemical reactivity with the calcium hydroxide of the cement, occurs substantially by the non-crystalline character of the silica and by its great specific superficial area (10 to 30 $m^2/g$), that it depends on its particle size (lower than 1 μm). Nevertheless, the silica fume has a relatively low bulk density, so that the costs for their shipment and storage are relatively high. On the other hand, the silica fume form a great amount of dust and is difficult to make it flow; also it cannot be transferred into storage silos by pneumatic lines, bucket elevator or screen conveyor as easily as the cement can be.

On the other hand, the natural pozzolans are crude or calcined natural materials that have pozzolanic characteristics. Some natural pozzolans include volcanic ashes, pumicites, opaline cherts and shales, tufts and some diatomaceous earths.

The characteristics of natural pozzolans vary considerably, depending on their origin. This is caused by variable proportions of the active materials and their mineralogical and physical characteristics. Most of the natural pozzolans contain important amounts of silica, alumina, iron oxide and alkaline agents, which also react with calcium hydroxide and alkalis (sodium and potassium) to form more complex compounds.

The molecular structure as well as the amount of silica present in pozzolans is also very important. Generally, the amorphous silica reacts more quickly with calcium hydroxide and alkalis than does silica in the crystalline form (quartz, for example).

When a mixture of Portland cement and a pozzolan reacts, the reaction progresses like an acid-base reaction of lime and alkalis with oxides ($SiO_2+Al_2O_3+Fe_2O_3$) of the pozzolan. This generates a gradual decrease in the amount of free calcium hydroxide by the formation of calcium silicates that will add force to the cement, and an increase in the CSH formation and calcium aluminate silicates that are similar to the products of hydratation of Portland cement. Has been found that the partial replacement of Portland cement by pozzolan works to increase the resistance of the concrete to sulphate and seawater attack, which is in part attributable to the removal of free calcium hydroxide formed in the hydratation of Portland cement by its combination with the pozzolan. The final result will be that the concrete mixture will contain less calcium hydroxide and more CSH and other products of low porosity.

The shape, fineness, particle size distribution, density, and composition of natural pozzolan particles, influence in the characteristics of freshly mixed and hardened concrete, and the strength development of hardened concrete.

There are several advantages when combining pozzolans with concrete. Concrete that contains a pozzolan typically has lower permeability; also the pozzolans have been used in low cement content concrete to reduce the temperature increase of the concrete, in comparison with concrete mixtures that contain Portland cement like the only cementitious material. The slower index of heat development with pozzolans allows more economic removal of heat in comparison with concrete that do not contain them.

On the other hand, almost any pozzolan when it is used in sufficient quantity is capable of preventing the excessive expansion resulting from the alkali-silica reaction. This reaction implies the interaction of hydroxyl ions associated with alkalis in Portland cement with certain siliceous components of the aggregates in concrete. The reaction products can cause excessive expansion, cracking, and the general deterioration of the concrete. It has been observed that the natural pozzolans are generally more effective than fly ashes to controlling the alkali-silica reaction.

The use of natural pozzolans with Portland cement for the concrete obtaining generally increases its resistance to aggressive attack by seawater, to sulphate solutions from soil, and to natural acid waters. The relative improvement is greater for concrete with low cement content.

The addition to the cement of a low quantity of pozzolanic siliceous material finely ground, generates insoluble salts that add cementitious value to the mixture; nevertheless, the calcination of the siliceous material is very important, since no reaction will happen between this material and the free lime unless the product has been treated later at high temperature, that is to say, treated under hydrotermic conditions.

There are multiple modifications to the pozzolanic materials, nevertheless, the particle size is one of the most important; by this way those materials with very reduced particle sizes are distinguished, which are called microsilicas. In this group are distinguished the synthetic silicas, the silica fume and natural silicas being these the most common in the market.

These products characterize by a high content of silica and particle sizes from 10 to 100 times smaller than the cement, which makes its application successful to make the concrete mixtures denser.

The silica fume is recognized like the main ingredient for high performance concrete, nevertheless, presents some disadvantages, such as:

a) The actual production is limited by smelting of silica,
b) The price by ton is high, and
c) It requires be used along with reducing water additives of high spectrum due to its lower particle size.

Unlike the silica fume, the suitably processed natural microsilicas, compete in quality with the silica fume at lower costs.

Like the pozzolanic materials, the microsilica allows to improve the cement characteristics, contributing to the improvement of a greater abrasion resistance, greater resistance to the chemical attack and a very low diffusion of chlorine ions. This allows that the resulting cements can properly be used in adverse environments, such as soils with high humidity or high sulphate contents, or marine environments.

Until now, multiple options have been generated with respect to siliceous materials, with natural or synthetic origin that allow increasing the cement durability. In this sense have been obtained silica mixtures with an ample distribution of different particle sizes[1,2], hydrophobic silicas obtained from silicone oil precipitation[3], silica mixtures with $CaCO_3$[4], colloidal silicas[5,6], silicas obtained like reaction products between bauxite and acids[7], silica fume humidified dusts to improve their fluidity[8], resulting silicas from the magnetic metal separation from rocky wastes[9], synthetic microsilicas with high reflectivity[10], stable watery dispersions of microsilica mixed with metal oxides[11], microsilicas with bulk controlled densities[12], microsilica dispersions that do not present thixotropic effect[13], spherical silicas with specific diameters[14], microsilicas mixed with chelating agents[15] or treated with acids[16], as well as silicas with tertiary structures from geothermal water[17].

However, the mentioned siliceous materials previously are obtained from processes that involve the addition of multiple substances that can provide negative or undesirable effects when making contact with the cement. Also, the processes for their obtaining tend to be complex and to use great amounts of energy and infrastructure, which can increase considerably their costs.

Due to previous, is necessary to count with pozzolanic materials with advisable characteristics that allow to continue improving the mechanical and chemical properties of the concrete or cement, and that allow to be obtained by simplified processes from natural sources.

BRIEF DESCRIPTIONS OF THE DRAWINGS

Figure 15:
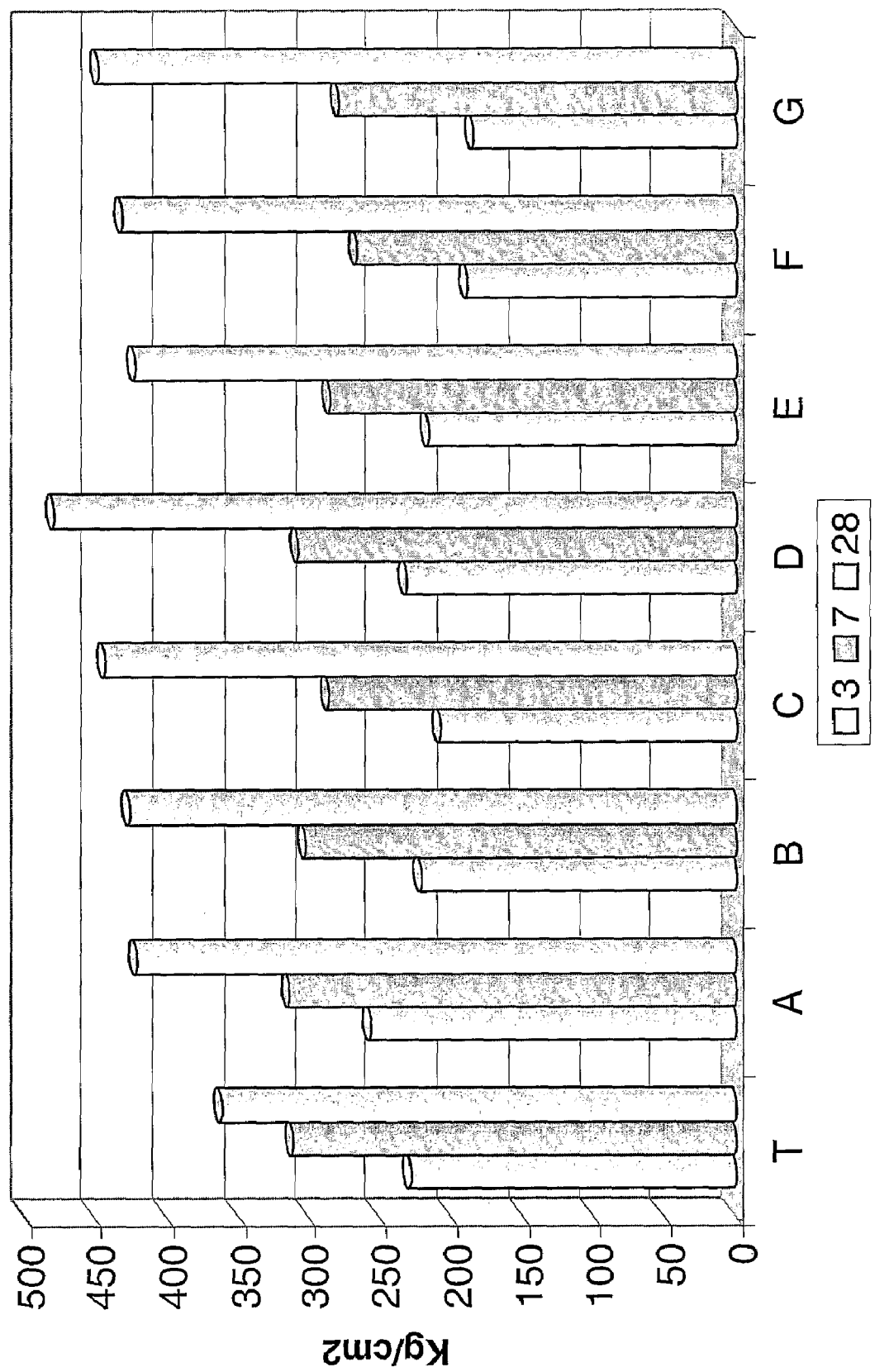

FIG. 15 shows a comparative graphic of compressive strength (ATSM C-311) in concrete mixtures with the microsilica of the invention (series A to D) and silica fume (series E to G) at 3, 7 and 28 days, using Portland cement as a control (T). The used proportions of the materials were 5% (A and E), 10% (B and F), 15% (C and G) and 20% (D).

Figure 16:
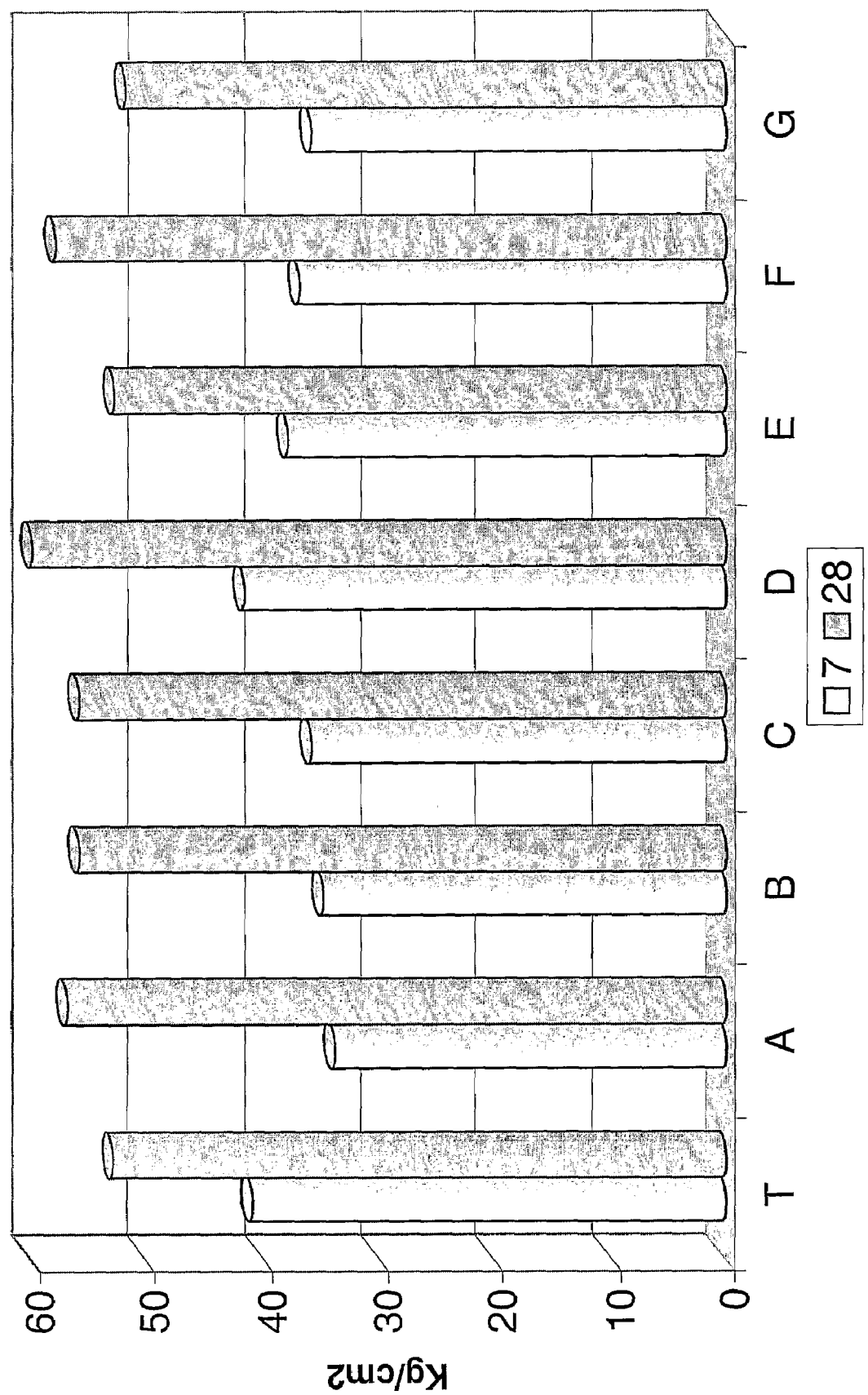

FIG. 16 shows a comparative graphic of flexion strength in concrete mixtures with the microsilica of the invention (series A to D) and silica fume (E to G) at 7 and 28 days, using Portland cement as a control (T). The used proportions of the materials were 5% (A and E), 10% (B and F), 15% (C and G) and 20% (D).

Figure 17:
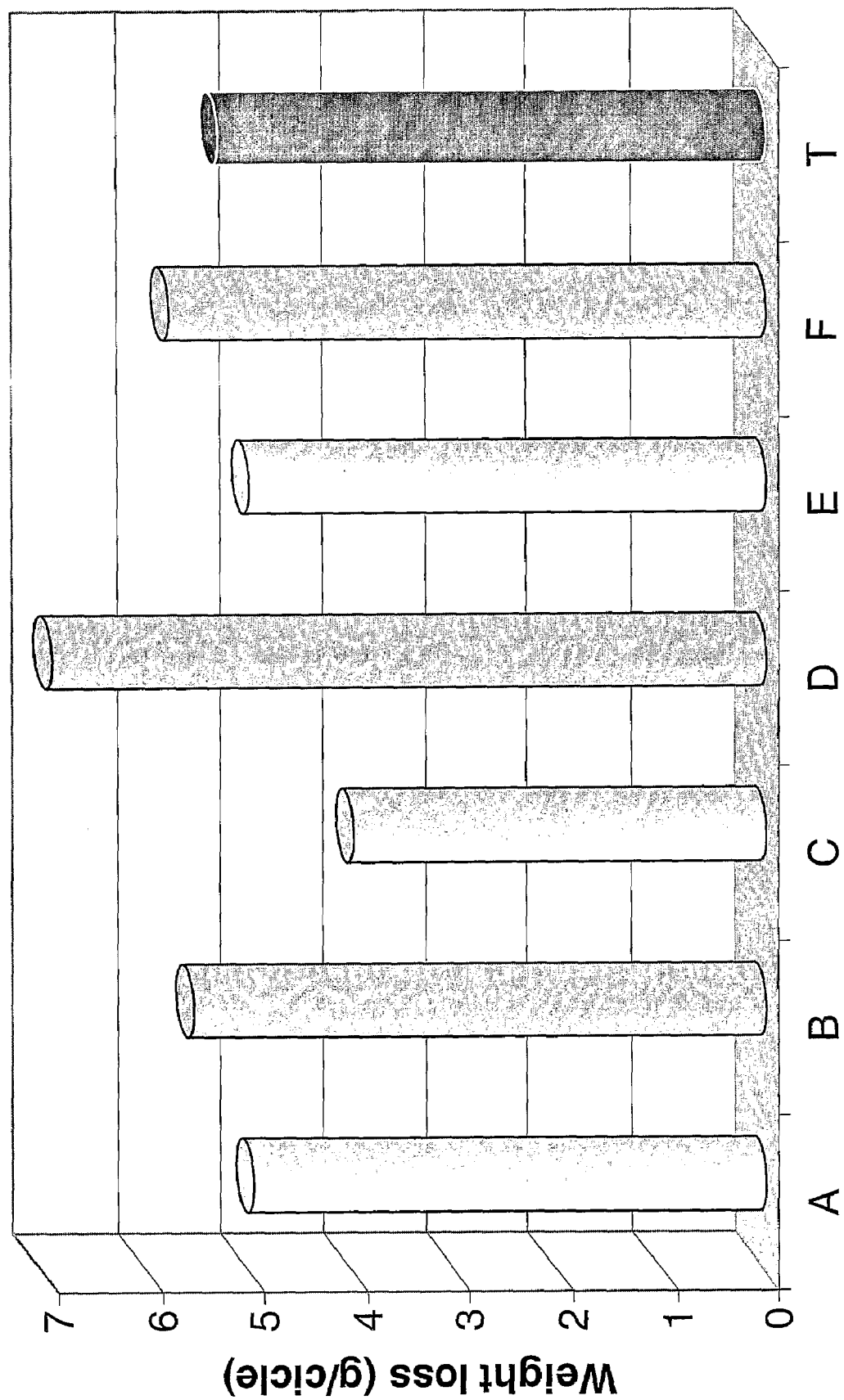

FIG. 17 shows a comparative graphic of abrasion index in concrete mixtures with the microsilica of the invention (series A, C and E) and silica fume (series B, D and F) at 1, 3, 7 and 28 days, using concrete 300 as a control (T). The values are expressed in material weight loss by cycle (g). The proportions of the materials used were 5% (A and B), 10% (C and D) and 15% (E and F).

Figure 18:
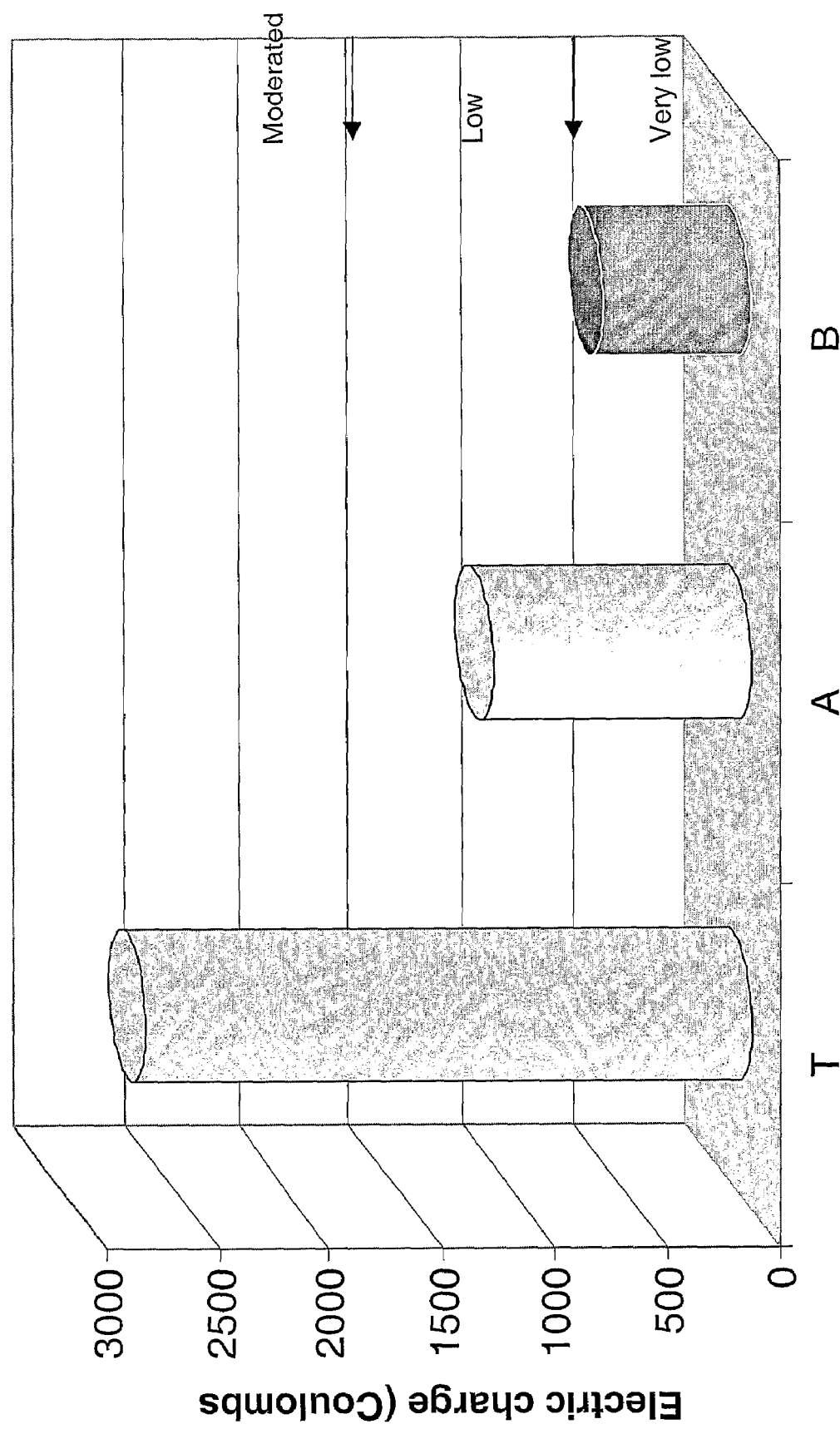

FIG. 18 shows a comparative graphic of chloride ion penetrability (ASTM C-1202) in concrete mixtures with the microsilica of the invention (series A) and silica fume (B), using Portland cement as a control (T). The low, very low and moderate permeability zones can be distinguished.

Figure 19:
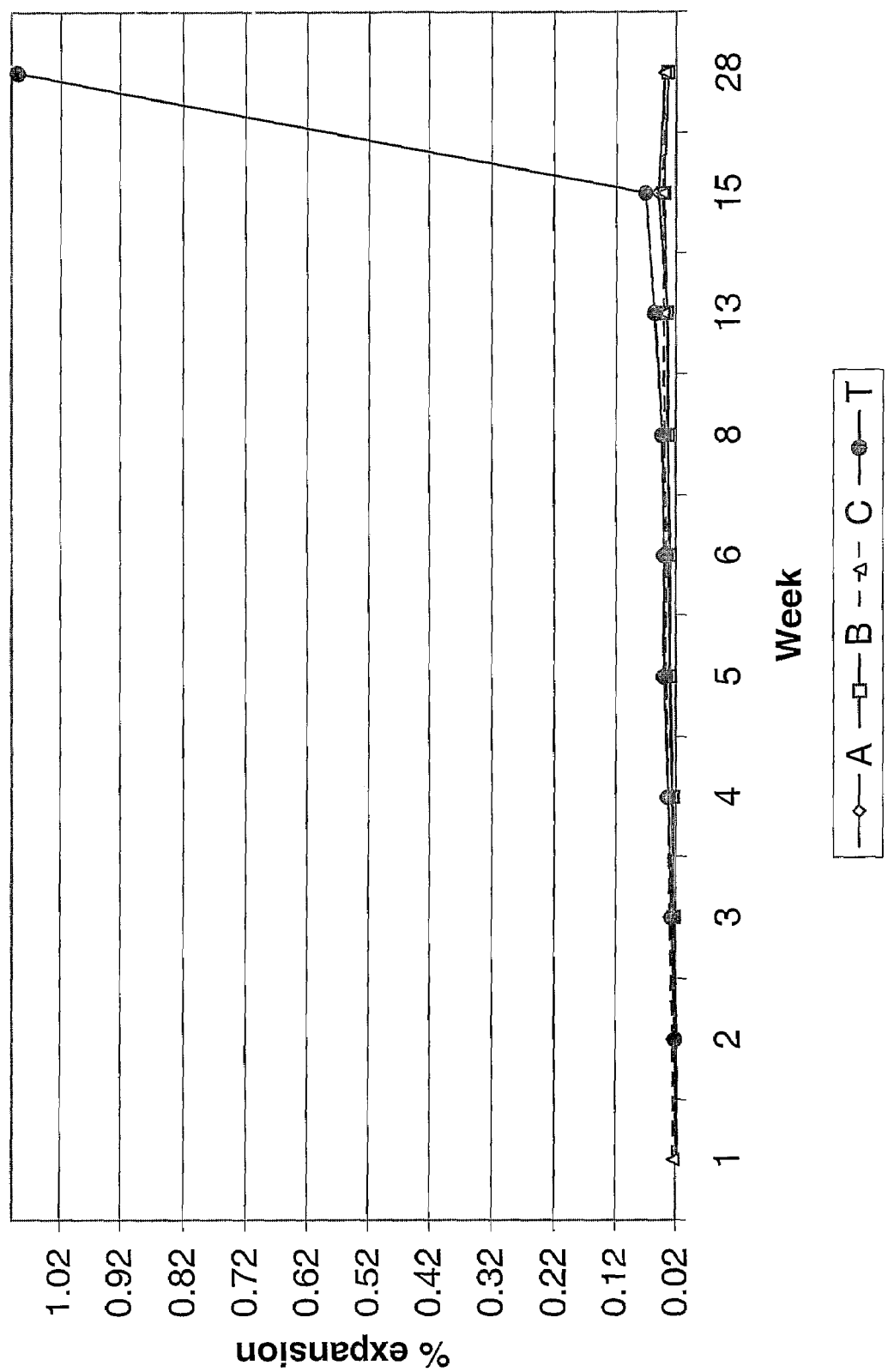

FIG. 19 shows a comparative graphic of sulphate attack resistance (ATSM C-1012) in concrete mixtures with the microsilica of the invention (series A to C) and Portland cement as a control (T) at different times. The material proportions used were 5% (A), 10% (B) and 15% (C).

Figure 20:
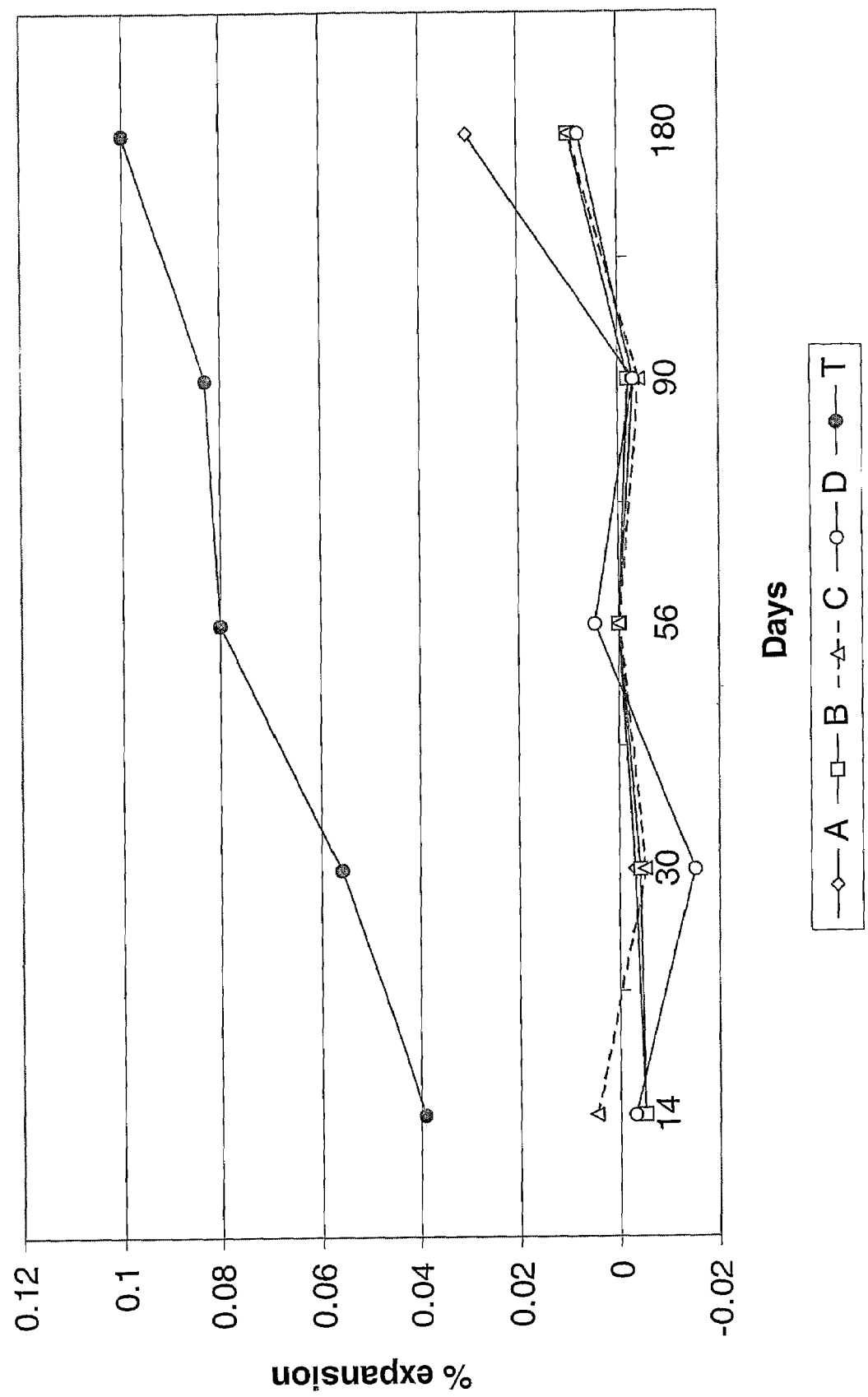

FIG. 20 shows a comparative graphic of potential resistance to alkali aggregate reactivity (ASTM C-227) in concrete mixtures with the microsilica of the invention (Series A to D) and Portland cement as a control (T) at different times. The proportions of used materials were 5% (A), 10% (B), 15% (C) and 20% (D).

Figure 21:
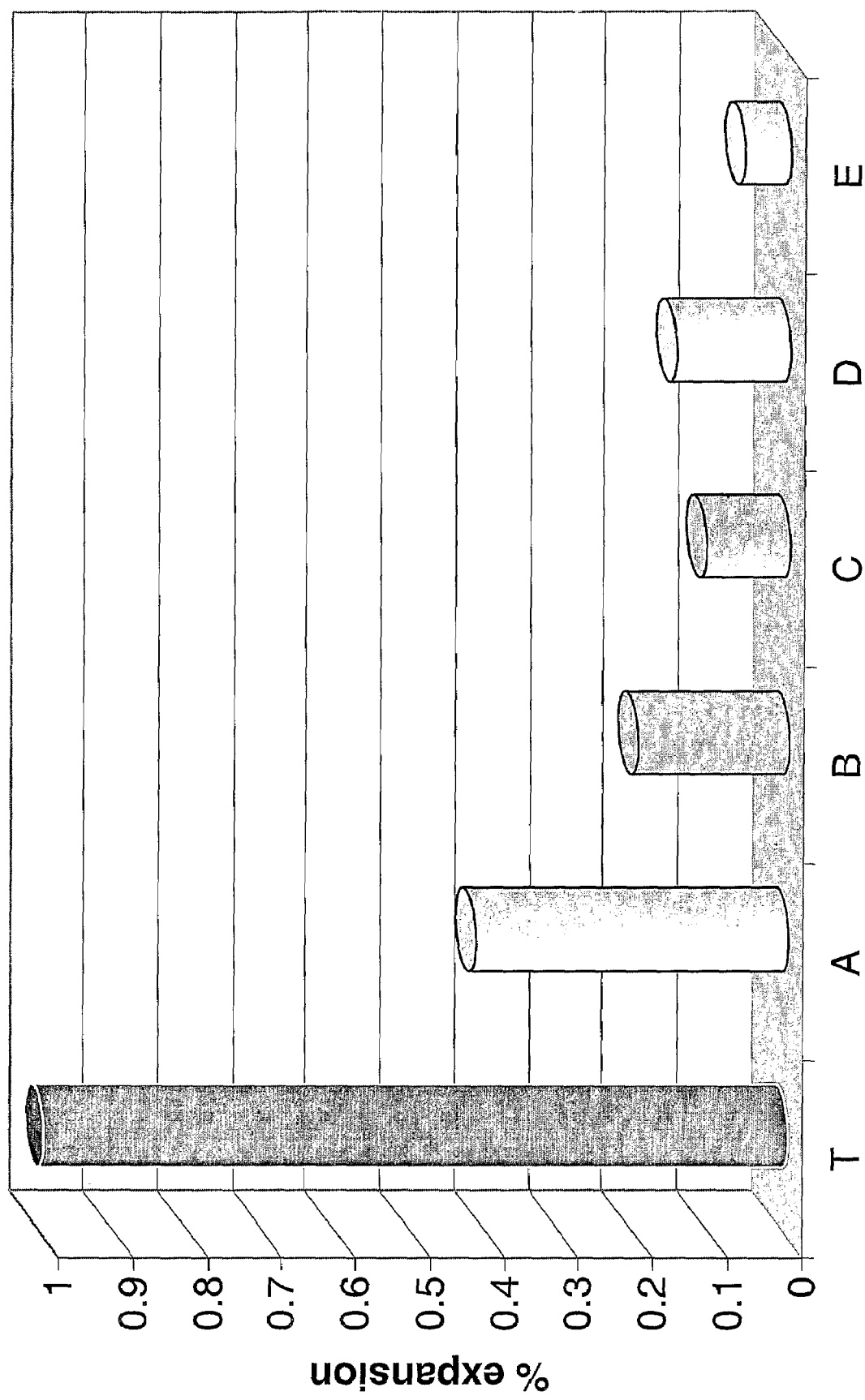

FIG. 21 shows a comparative graphic of resistance to attack by alkali aggregate reaction (ASTM C-1260) in concrete mixtures with the microsilica of the invention (Series A, D and E), silica fume (B series), flying ashes (C series) and low alkali Portland cement as a control (T series) at 16 days. The proportions of used materials were 10% (A and B), 15% (D), 20 (E) and 25% (C).

SUMMARY OF THE INVENTION

It is an objective of the present invention to provide natural siliceous pozzolanic materials with increased capacity in its pozzolanic activity.

It is another objective of the present invention to provide siliceous pozzolanic materials composed mainly of cristobalite and tridimite, for example criptocrystaline.

It is another objective of the presented invention to provide natural microsilicas composed mainly of cristobalite and tridimite, and with pozzolanic indexes greater than the microsilicas known until now.

Another one of the objectives of the present invention is to provide a simple and low consumption energy method for the obtaining of natural microsilicas composed mainly of cristobalite and tridimite with high pozzolanic indexes, from geologic deposits.

The present invention provides a new pozzolanic material basically conformed of microsilica with a minimum of silica of 85% in its composition, where the silica of the material is conformed mainly of cristobalite and tridimite in a proportion from 55 to 90% in weight with respect to the total weight of silica. The microsilicas of the invention have a pozzolanic activity at least of 40% greater than the microsilicas composed only by quartz, smaller densities, and a particle size of 40 μm at 98%. The pozzolanic index of the materials of the invention reaches greater values than 120% at 28 days in a consistent way and the observed superficial area of the material (BET) is similar than the superficial area of microsilica fume without need to grind the material in excess.

Concretes formed with mixtures of cement and the pozzolanic material of the invention, develop a very advisable impermeability as well as high compressive strengths, comparable to the developed by other high performance pozzolanic materials, for example silica fume. The microsilicas of the invention improve the cement abrasion indexes and allow diminishing in a dramatic way the expansion caused by the sulphate attack. The pozzolanic material described here can be used as substitute of the commercial silica fume as well as other pozzolanic materials in the production of high performance concretes.

DETAILED DESCRIPTION OF THE INVENTION

The invention is based on the discovery that the best characteristics as pozzolanic material in the microsilica are directly related with the presence of greater percentage of cristobalite and tridimite in the silica ($SiO_2$) of the material, in comparison with those silicas composed mainly by quartz. This allows obtaining microsilicas like improved pozzolanic materials that contains greater amounts of cristobalite and tridimite in the silica.

The cristobalite and tridimite are quartz polymorphs, which means that they are composed of the same chemical elements ($SiO_2$), but they have a different crystalline structure. Within the polymorphic members of the quartz group, the coesite and the stishovite are also included, which appear depending of pressure and temperature conditions of which the quartz is exposed. Table 1 shows the different polymorphic modifications from the quartz.

TABLE 1

| Modification | Crystalline system | Density g/cm$^3$ | Formation conditions |
|---|---|---|---|
| Quartz | Trigonal | 2.65 | T < 573° C. |
| Quartz | Hexagonal | 2.53 | T > 573° C. |
| Tridimite | Monoclinic | 2.27 | |
| Tridimite | Hexagonal | 2.26 | T > 870° C. |
| Cristobalite | Tetragonal | 2.32 | |
| Cristobalite | Cubic | 2.20 | T > 1470° C. |
| Coesite | Monoclinic | 3.01 | P > 20 kbar |
| Stishovite | Tetragonal | 4.35 | P > 80 kbar |

The cristobalite is only metastable at normal surface temperatures; meaning that, if it were possible, it would slowly convert to the quartz structure. But this is a slow and complicated process taking thousands of years if it happens at all. It is a slow process mostly because the transformation implies the breaking of bonds and the rearrangement of atoms. Although has been demonstrated that microsilicas that they contain above of 85% in weight of silica ($SiO_2$) has advisable pozzolanic activity for construction materials, the microsilicas of the invention contain a greater pozzolanic activity in comparison with the microsilicas known actually. The microsilicas of the invention have a pozzolanic activity at least of 40% greater than the microsilicas composed only by quartz or which those in which the quartz is in an equal or greater percentage of 50% in weight with respect to the total weight of silica. In the microsilicas described here, the joint amount of cristobalite and tridimite are from 55 to 90% in weight with respect to the total weight of silica, preferably from 70 to 90% in weight.

In one of the embodiments of the invention, the crystal size of cristobalite and tridimite can be from 5 to 12 nm, preferably from 6 to 11 nm, with which these elements are criptocrystalline.

Also, the microsilicas of the invention have smaller densities (from 5 to 10%) that those microsilicas composed by high amounts of quartz, which allows to reduce the material weight in similar volumes.

On the other hand, like the rest of the microsilicas, the materials of the invention can increase their pozzolanic activity by calcination means and to react in an advisable way with cementitious materials to increase and to improve the physical characteristics of these.

The microsilicas of the invention have advisable particle sizes to mix themselves with cementitious materials, allowing an intimate interaction with the cementitious material, without need to use high energy milling processes to diminish more the particle size. The microsilicas of the invention generally have a particle size distribution equal or smaller to 40 μm at 98%, similar sizes than the reported for another type of microsilicas. The high percentages of cristobalite and tridimite in the pozzolanic material of the invention, allow increasing the pozzolanic activity of the material without need to reduce even more their particle size.

Also the greater percentages of cristobalite and tridimite in the microsilicas of the invention, do not alter their physical properties like pozzolanic material to be used in cementitious materials, as well do not alter either the typical properties of the cementitious material with which they can be combined.

The high percentages of cristobalite and tridimite allow improving in a surprising way the pozzolanic characteristics of the microsilicas, without need to put the material under posterior chemical transformation processes or calcination at high temperatures.

The pozzolanic index of the materials of the invention reaches greater values than 120% with respect to cement control at 28 days in a consistent way, similar values than the values reached by highly processed microsilicas.

The microsilica 600, an extracted product from a natural deposit of white geosilica found in New Zealand, contains an average percentage of $SiO_2$ of 87.9%, a pozzolanic index of 119% and a particle size of 20 µm at 97.9%. Also, the physical and chemical characteristics of the material, turn it in a high reactivity pozzolanic material, which allows improving many of the cement characteristics. Nevertheless, for its obtaining, it is necessary to watch continuously the material milling process to obtain the mentioned particle sizes[18]. Unlike the mentioned above, the pozzolanic material of the present invention have pozzolanic indexes greater than 120% with a particle size of 40 µm at 98%, a greater particle size value than the mentioned previously. As it is demonstrated in the present invention, the pozzolanic indexes developed by the pozzolanic material depend of the crystalline composition of the silica. Due to this it is evident that when diminishing the particle size of material of the invention at levels of the microsilica 600, the pozzolanic properties of the material are even increased more due to the increase in the superficial exposed area of the material; this allows to a greater interaction and reactivity with the components of the cement.

Like other natural microsilicas, the microsilica of the invention can be obtained from materials with high silica, like for example from ignimbrite.

For the aims of the present invention, the pozzolanic material described here is obtained in a general way by means of the following process:

a) Obtaining the siliceous material from natural deposits, preferably from ignimbrite deposits, b) Selecting those parts of the deposit that contain $SiO_2$ in an equal or greater amounts than 85% in weight with respect to the total weight of the material, c) From the parts obtained in b), to select those that have a density smaller than 2.4 g/cm$^3$, d) Crushing the parts obtained in c) until obtaining a particle size smaller than ½", e) Calcination of the obtained material previously, at 590 to 620° C., and f) Milling the calcined material until obtaining a mesh particle size of 325 at 96% like minimum.

The method of the invention allows obtaining pozzolanic materials with a pozzolanic index equal or greater to 120%; nevertheless, eliminating calcination step of the process previously described, the obtained material develops pozzolanic indexes from 110 to 120%, which also can be used for certain applications than the pozzolanic material with a greater pozzolanic index. In this sense it is known that the pozzolanic activity of materials with high silica content can recover with a heat treatment at temperatures of 500 to 750° C. and later milling of the material during a time of 30 to 60 minutes[19].

The process of the invention allows obtaining pozzolanic materials with high silica content and greater proportions of cristobalite and tridimita in the silica of the material, in comparison with other pozzolanic materials. As the present invention demonstrates it, the obtained pozzolanic material exhibits pozzolanic indexes at least of 40% greater than those pozzolanic materials that contain predominantly quartz in the silica, independently of the percentage of silica that contains the pozzolanic material.

Also and in a surprising way, when the proportion of cristobalite and tridimite increase in the crystalline composition of the silica of the pozzolanic material of the invention, then the pozzolanic index of the material increases in a considerable way.

Although the crystal size of cristobalite and tridimite seems not to be determining in the pozzolanic activity of the microsilica of the invention, a lower crystal size along with a high percentage of such in the silica of the material, is associate with a greater performance of the microsilica (see table 9).

On the other hand, the existence of a greater proportion of cristobalite and tridimite in the pozzolanic material of the invention, does not affect negatively the behavior of the material in common tests of resistance and durability of concrete and mortars, developing similar physical and chemical properties or inclusive better properties than the observed for other similar pozzolanic materials.

Because the pozzolanic material of the invention can be obtained from the calcination and milling of raw materials such as the ignimbrite, this can be process with the same procedures and equipment used for the ordinary cement production (rotatory furnace and mill with separator, for example), allowing to use the common infrastructure that can be found in industrial plants for producing and processing cement.

Although the pozzolanic material of the invention can be obtained with the common procedures to obtain cement, is desirable that the material is ground to obtaining a particle size smaller to 20 microns to increase even more the pozzolanic activity of the material of the invention. Nevertheless, although the particle size of the microsilica described here is greater than the observed for the silica fume or microsilica 600, the observed superficial area of the material (BET) is similar than the superficial area of microsilica fume (see table 10); this characteristic was obtained in the microsilica of the invention without need to grind the material in excess.

Unlike the invention, Eriksson describes the obtaining of a fine active aggregate like pozzolanic material that consists of a mixture of an inactive dry component like quartz or lime and a substance that contain abundant amorphous silicon oxide. This mixture is ground with the purpose of activating the inactive material so that this it reacts in an advisable way with the lime of the cement[20]. Nevertheless, this material involves the addition of elements that increase their costs of obtaining and which they can react in an undesirable way with other elements of the cement.

In the literature have been reported diverse compositions that include cristobalite and tridimite to improve the characteristics of diverse materials, however, all of them include other active substances, responsible to react mainly with the cement elements.

For the obtaining of cristobalite and tridimite crystals for mortar improvements, has been reported the silica thermal conversion (1,450° C.), altogether with the use of plastic agents (cellulose, molases or maltodextrine) and different compounds such as sodium silicate, boron oxide or lime. These compositions are useful to avoid disparities in the different levels of expansion that can appear in mortars for brick union at high temperatures that are composed basically by quartz; with it the formation of fissures in these materials is avoided[21].

There have been obtained improved bricks with base on silica under heat treatment with the purpose to generating uniform crystalline phases of tridimite and cristobalite in the brick, and later mixture with not preheated siliceous material. To such mixtures it is added minerals such as sodium chloride, potassium or sodium carbonate to accelerate the crystalline transformation of quartz, warming up later the resulting mixtures until quartz conversion to tridimite and cristobalite[22].

In general, have been reported multiple methods for the obtaining of cristobalite from quartz or siliceous materials, nevertheless, the great majority of them uses heating processes of these materials at high temperatures (1,000 to 1,600° C.), adding catalytic substances that allow the obtaining of this crystalline phase in part of the obtaining process, such as oxides of alkaline or alkaline earth metals[23], carbonates or bases of alkaline metals[24] or alkaline phosphates or fluorides[25].

On the other hand cement additives that use siliceous materials to increase the cement chemical resistance are known. The cement additive described by Vsevolod[24], constituted by a mixture of finely divided quartz with a surface area from 1,000 to 5,000 cm$^2$/g in a proportion in weight from 30 to 80%, and cristobalite and/or tridimite in a proportion in weight from 20 to 70%, allows to increase the cement water resistance in comparison with additives conformed solely by quartz. The process described for the obtaining of this additive, involves the mixture of siliceous material with different catalysts, such as NaOH, KOH, NaCO$_3$, KCO$_3$ or mixtures of such, with a subsequent heat treatment at very high temperature (1,000 to 1,550° C.). Nevertheless, the mentioned additive does not increase in a consistent manner the cement compressive strength in all cases and not all of the mixture material conserve a homogenous particle size, since only the cristobalite and/or tridimite crystals have a particle size smaller to 1 mm, which can cause problems in its interaction with cement particles. On the other hand, the cristobalite and/or tridimite crystals contain in their surface important amounts of sodium or potassium oxides, characteristic that results of vital importance to observed the improvement effect in the cement; these important amounts of oxides can be negative for a better chemical interaction between the siliceous material and the cement components.

Unlike the additive described by Vsevolod[24], the pozzolanic material of the invention not contains a significant amount of sodium and potassium oxides, the particle size is smaller to 1 mm in an homogenous way (crystals smaller to 20 nm) and, in addition, in all the cases increases the cement compressive strength at 28 days. On the other hand, the pozzolanic effect of the material of the invention is not associated to the alkaline metal oxide presence, but to the own characteristics of the material, mainly to cristobalite and tridimite content. On the other hand, the process of obtaining of the present invention, allows using much lower temperatures to process the pozzolanic material, and without need to use additional siliceous materials previously treated.

Figure 3:
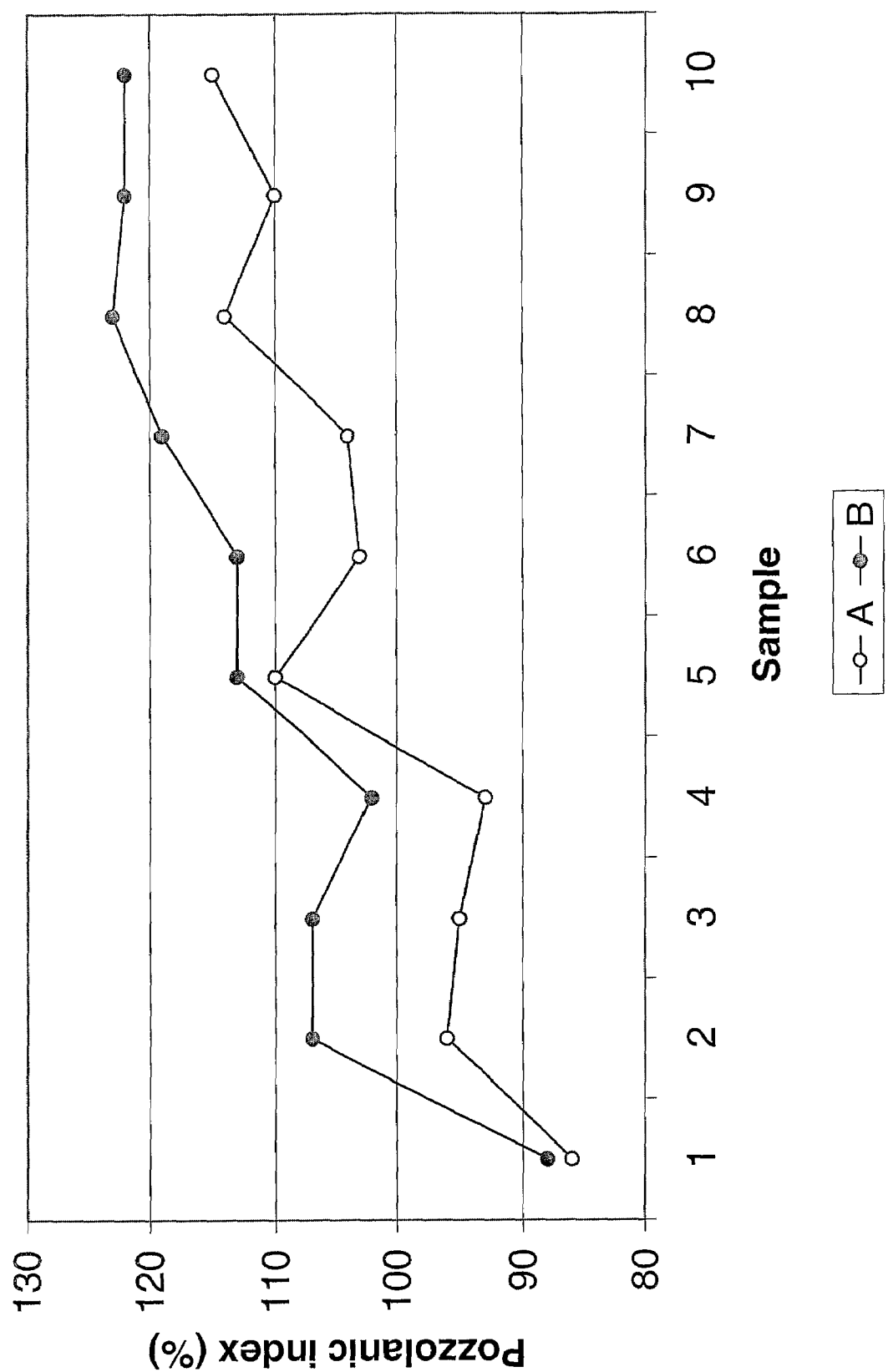
FIG. 3 shows a comparative graphic of pozzolanic index at 28 days for sample pairs of raw silica (A) and treated silica at 600-620° C. (B) from FIG. 1.
Figure 4:
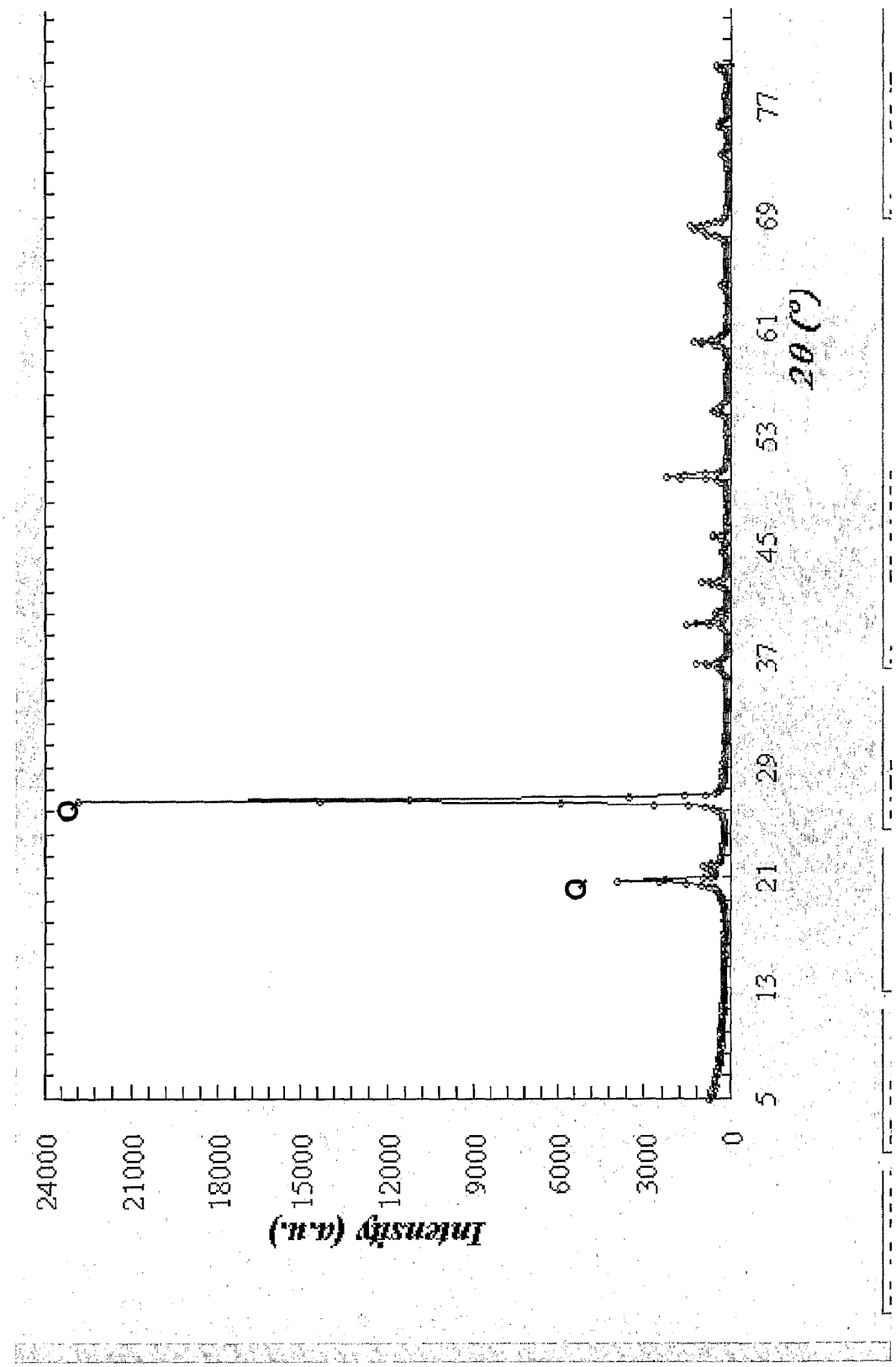
FIG. 4 shows an X-ray diffraction spectrum of the sample 1 from ignimbrite deposit of FIG. 1. Quartz crystalline phase can be distinguished (Q).

As it is demonstrated in the present invention, it is important to select the raw material derived from the silica deposit to process itself for the obtaining of the pozzolanic material, since diverse extracted samples from different parts of the same deposit develop different pozzolanic indexes, even after being treated according to the method of the invention (see FIG. 3). Also, samples extracted from deposit that contain high percentage of silica in their composition (near 90%), do not develop pozzolanic indexes superior to the 105% (see FIG. 3). The present invention demonstrates that the amount of cristobalite and tridimite that it is conforming the silica of the pozzolanic material, is determining for the increase in the pozzolanic properties of the material, reaching pozzolanic indexes greater to 120%, superior value to which develop well-known pozzolanic materials with percentage of silica near or even greater to 90%. As it is observed in FIGS. 3 and 4, the microsilica samples that contain only quartz, or high proportions of the same, have a poor performance in the pozzolanic indexes that they develop, in comparison with the microsilica of the invention. Also, the addition of cristobalite and tridimite to high performance microsilicas as it is the case of the silica fume in the same proportions that they exists in the material of the invention, did not improve its pozzolanic properties.

Like other microsilicas, the microsilica of the invention does not have cementitious properties of union by itself. Nevertheless, it can react with the lime of the cement at room temperature in the presence of water, when it gets to form mixtures with the cement that is tried to improve.

The concretes formed from cement mixtures and the pozzolanic material of the invention, develop a very advisable impermeability as well as high compressive strengths, comparable to the developed by other pozzolanic materials, as for example silica fume.

Also the material of the invention improves the cement abrasion indexes from 10 to 70% with respect to cements that use silica fume in the same proportions, and allows to diminish in a dramatic way the expansion caused by the sulphate attack in a 2,800% at 28 weeks.

With the microsilica of the invention, significant improvements in all cement properties can be obtained using low proportions of this material in the cementitious mixtures, generally using at least 5% in weight of the material.

The use of the material of the invention provides an important economic advantage in the generation of cement with improved properties, since it allows reductions in the used amount of Portland cement in the generated mixtures.

Due to the mentioned above, the pozzolanic material of the invention can be used as substitute of the commercial silica fume as well as other pozzolanic materials in the production of high performance concretes.

Like a way to illustrate the present invention, the following examples appear, without it limits the reach of the same one.

EXAMPLE 1

Obtaining of Raw Material

From a natural ignimbrite deposit located in the north of Mexico, diverse samples of rocky material were obtained; later, the material was put under chemical analysis to determine its composition. As it can be observed in table 2, the average content of silica in the rocky material was 92.14%, superior value that found in microsilica 600 and commercial silica fume and within the specifications according to ASTM C-1240.

TABLE 2

| Components | Rocky material | Microsilica 600 | Silica fume | ASTM C-1240 |
|---|---|---|---|---|
| SiO$_2$ [%] | 92.14 | 87.89 | 89.89 | 85 minimum |
| Al$_2$O$_3$ [%] | 1.2 | 4.31 | 0.10 | — |
| Fe$_2$O$_3$ [%] | 0.13 | 0.59 | 0.20 | — |
| CaO [%] | 0.66 | 0.32 | 0.37 | — |
| MgO [%] | 0 | 0 | 0.34 | — |
| K$_2$O [%] | 0.03 | 0.49 | 0.60 | — |
| Na$_2$O [%] | 0 | 0.1 | 0.06 | — |
| SO$_3$ [%] | 0.05 | 0.13 | 0.16 | — |
| PPI [%] | 3.2 | 0.8 | 1.5 | 3 maximum |
| Humidity | 0.98 | 5.01 | 4 | 6 maximum |

Diverse representative samples were taken later from the ignimbrite deposit, which were investigated individually in their chemical composition by means of chemical analysis by x-rays fluorescence. As it can be observed in table 3, all the obtained samples presented a silica percentage superior to 88% with nongreater differences of 2% among them.

TABLE 3

| Components | Track Drill's large drills | | Diamond large drills | | Surface samples | | | | | |
|---|---|---|---|---|---|---|---|---|---|---|
| | 1 | 2 | 3 | 4 | 5 | 6 | 7 | 8 | 9 | 10 |
| $SiO_2$ [%] | 90.85 | 90.09 | 88.39 | 88.67 | 90.03 | 90.49 | 89.65 | 92.48 | 91.23 | 90.4 |
| $Al_2O_3$ [%] | 0.37 | 0.69 | 1.19 | 0.66 | 3.18 | 3.13 | 3.08 | 1.83 | 1.70 | 1.92 |
| $Fe_2O_3$ [%] | 0.42 | 0.12 | 0.63 | 1.11 | 0.08 | 0 | 0.03 | 0.1 | 0.20 | 0.1 |
| CaO [%] | 0.46 | 0.66 | 0.21 | 0.41 | 1.40 | 1.22 | 1.38 | 0.82 | 1.92 | 1.87 |
| MgO [%] | 0.02 | 0.04 | 0 | 0.03 | 1.16 | 1.12 | 1.07 | 0.28 | 0.41 | 0.32 |
| $P_2O_5$ [%] | 0.06 | 0.07 | 0.17 | 0.09 | 0.41 | 0.34 | 0.41 | 0.09 | 0.09 | 0.01 |
| $K_2O$ [%] | 0.06 | 0.11 | 0.25 | 0.18 | 0.71 | 0.74 | 0.74 | 0.04 | 0.07 | 0.08 |
| $Na_2O$ [%] | 0.05 | 0.06 | 0.10 | 0.09 | 0.19 | 0.25 | 0.20 | 0.07 | 0.10 | 0 |
| $SO_3$ [%] | 0.07 | 0.07 | 0.11 | 0.10 | 0.22 | 0.18 | 0.18 | 0.10 | 0.19 | 0.25 |
| PPC | 3.20 | 5.70 | 5.40 | 5.98 | 2.30 | 2.21 | 3.01 | 3.10 | 3.50 | 4.20 |
| Total | 95.56 | 97.61 | 96.45 | 97.32 | 99.68 | 99.68 | 99.75 | 98.91 | 99.41 | 99.15 |
| A. Total | 0.09 | 0.13 | 0.26 | 0.21 | 0.66 | 0.74 | 0.68 | 0.10 | 0.15 | 0.05 |

EXAMPLE 2

Obtaining of the Pozzolanic Material

The material samples obtained in example 1 were transported from quarry to a cement processing plant. The samples were crushed later separately in a crushing jaw machine until obtaining a size smaller to ½" and later they were put under calcination at 590 to 620° C. in a rotatory furnace during 1 hr. Later, the resulting materials along with a milling additive as for example Darex or triethanolamine, were worn out separately in a ball mill with separator during 30 minutes until obtaining a mesh particle size of 325 at 96% as minimum. The treated materials were placed in containers or plastic bags until their use.

EXAMPLE 3

Determination of the Pozzolanic Material Density

Figure 1:
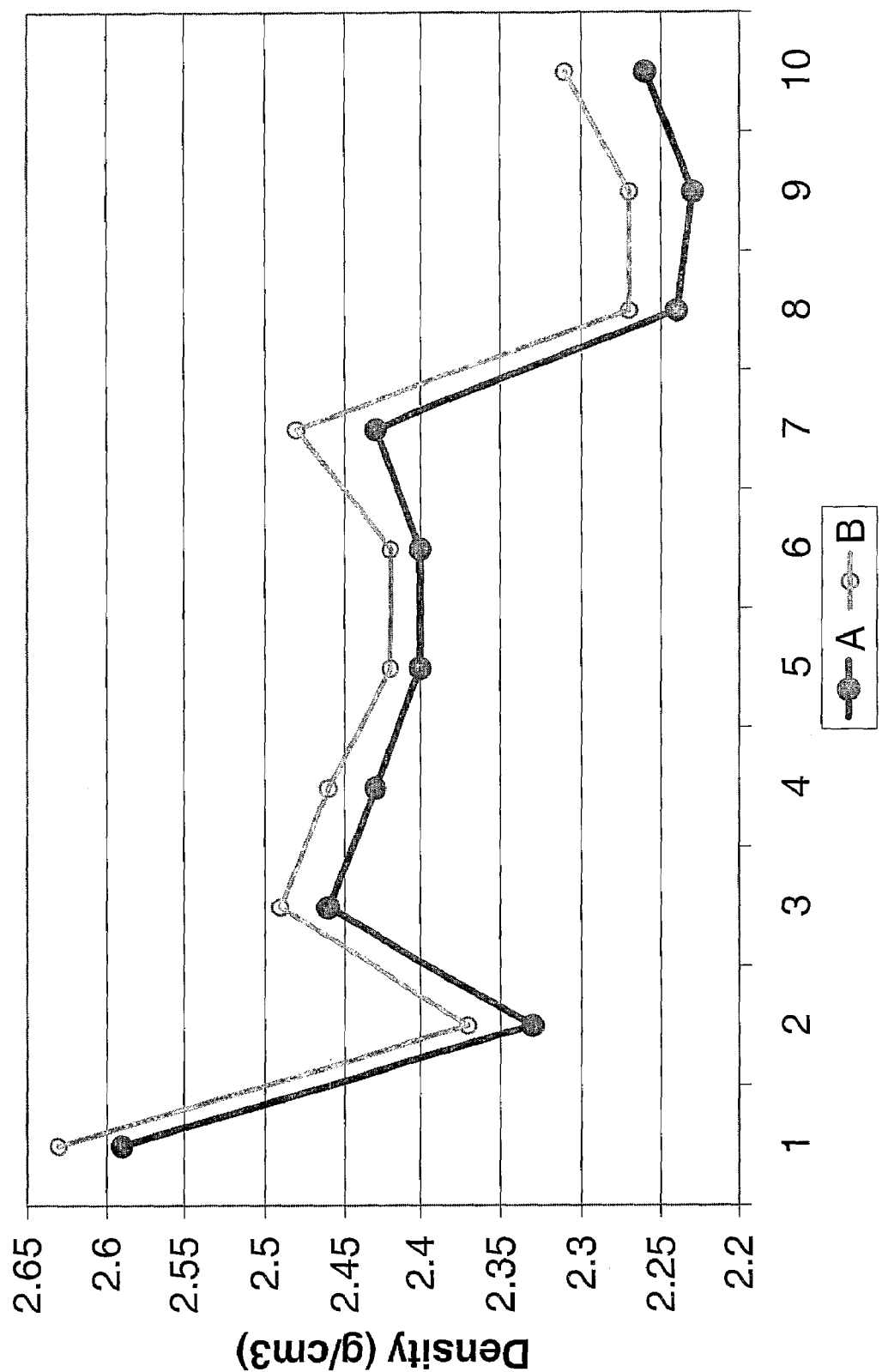
FIG. 1 shows a comparative graphic of density for raw (A) and calcined (B) silica samples from ignimbrite silica deposit.

The density of the samples obtained in example 2 was determined using an Accupyc picnometer model 1330. The obtained results were compared with the density of the same samples but without calcination (crude samples). As it is observed in table 4 and in FIG. 1, in all cases the density of the samples of the pozzolanic material subject to calcination at 610° C., was greater than the density value of the corresponding sample without calcination; also substantial differences between the density values from different crude samples (from 2.23 to 2.59 g/cm³) and calcined samples were observed (from 2.27 to 2.63 g/cm³).

EXAMPLE 4

Pozzolanic Index Evaluation from Pozzolanic Material

The treated samples from pozzolanic material obtained in example 2, were evaluated in their pozzolanic index according to ASTM C-311 and compared their developed compressive strengths in cements with these materials and silica fume. This method establishes in a general way, that the pozzolanic material must be mixed with Portland cement in a relation in weight of 20:80 respectively and make compressive strength tests according to ASTM C-109 to this mixture, comparing the obtained results with the compressive strength of the Portland cement used as a control; the pozzolanic index of the proven material, turns out to divide the compressive strength mixture of this material by the compressive strength of the cement control and to multiply it by 100.

Diverse microsilica samples of the invention were mixed with Portland cement to measure the resulting compressive strength in buckets according to ASTM C-109, for which 20% in weight of Portland cement were replaced by the pozzolanic material under test.

Figure 2:
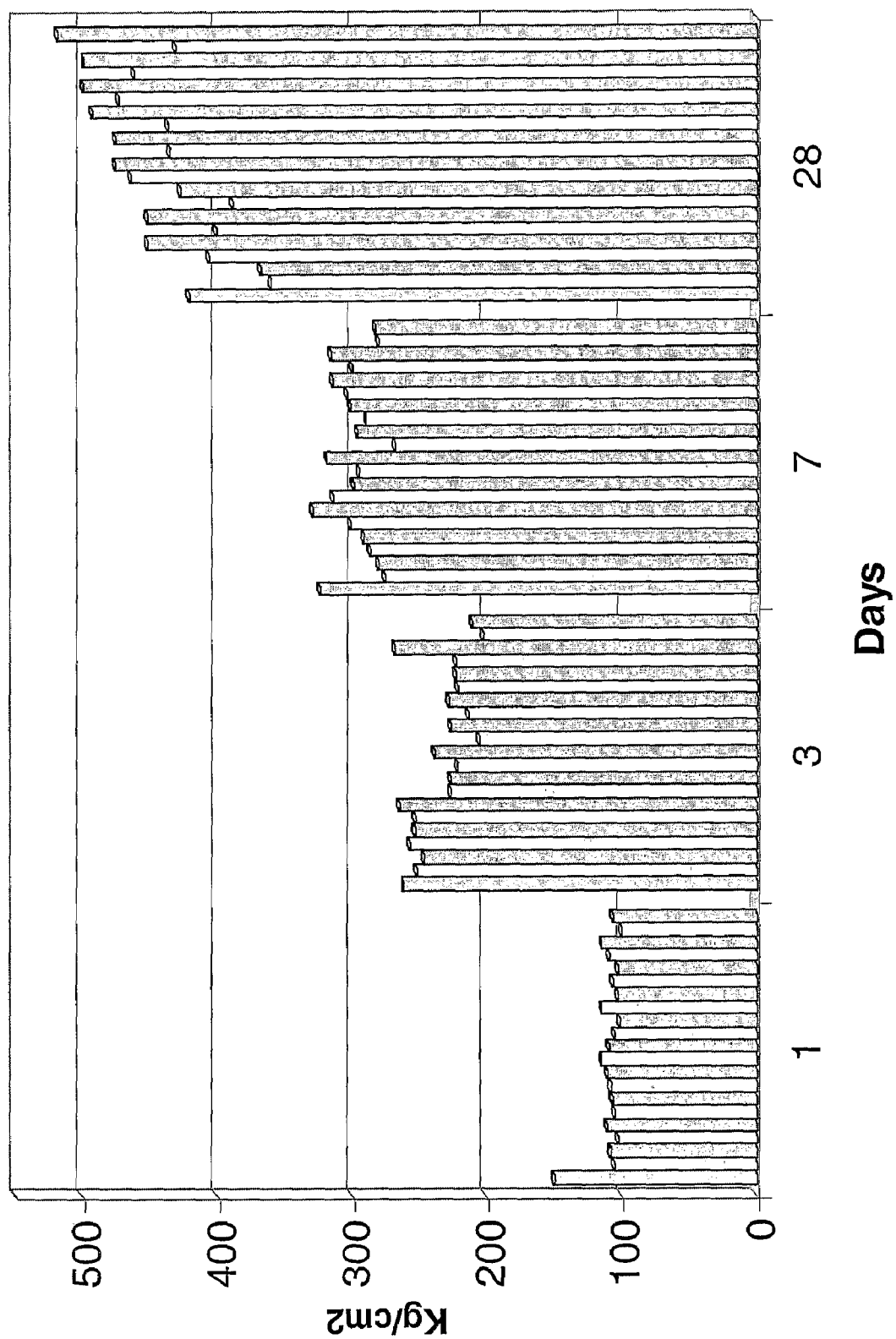
FIG. 2 shows a comparative graphic of compressive strength (ASTM C-311) for ignimbrite mixtures pairs from FIG. 1 with Portland cement, using Portland cement as a control (first column of each series) at 1, 3, 7 and 28 days.
Figure 5:
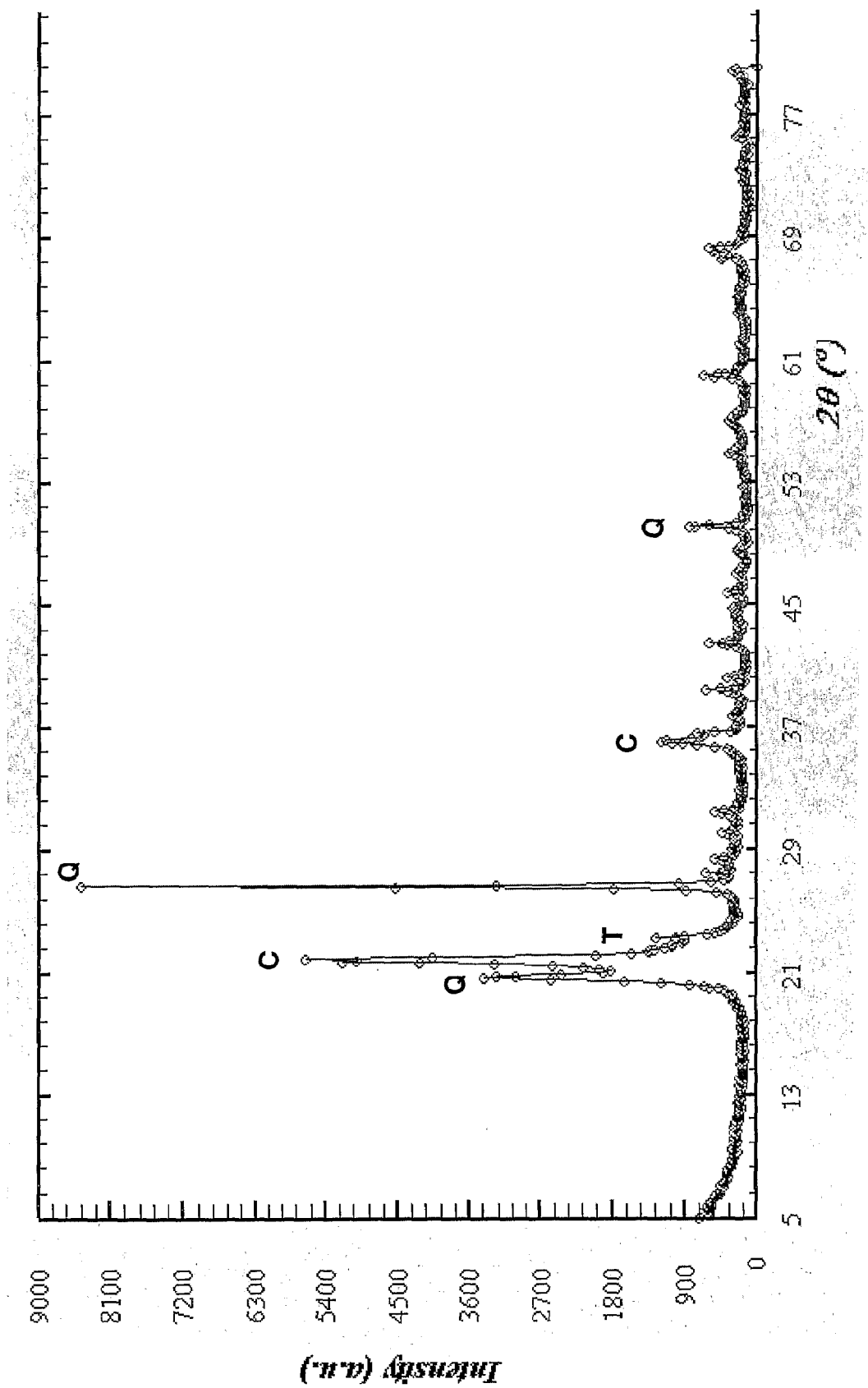
FIG. 5 shows an X-ray diffraction spectrum of the sample 2 from the ignimbrite deposit from FIG. 1. It can be distinguished the crystalline phases of quartz (Q), cristobalite (C) and tridimite (T).
Figure 6:
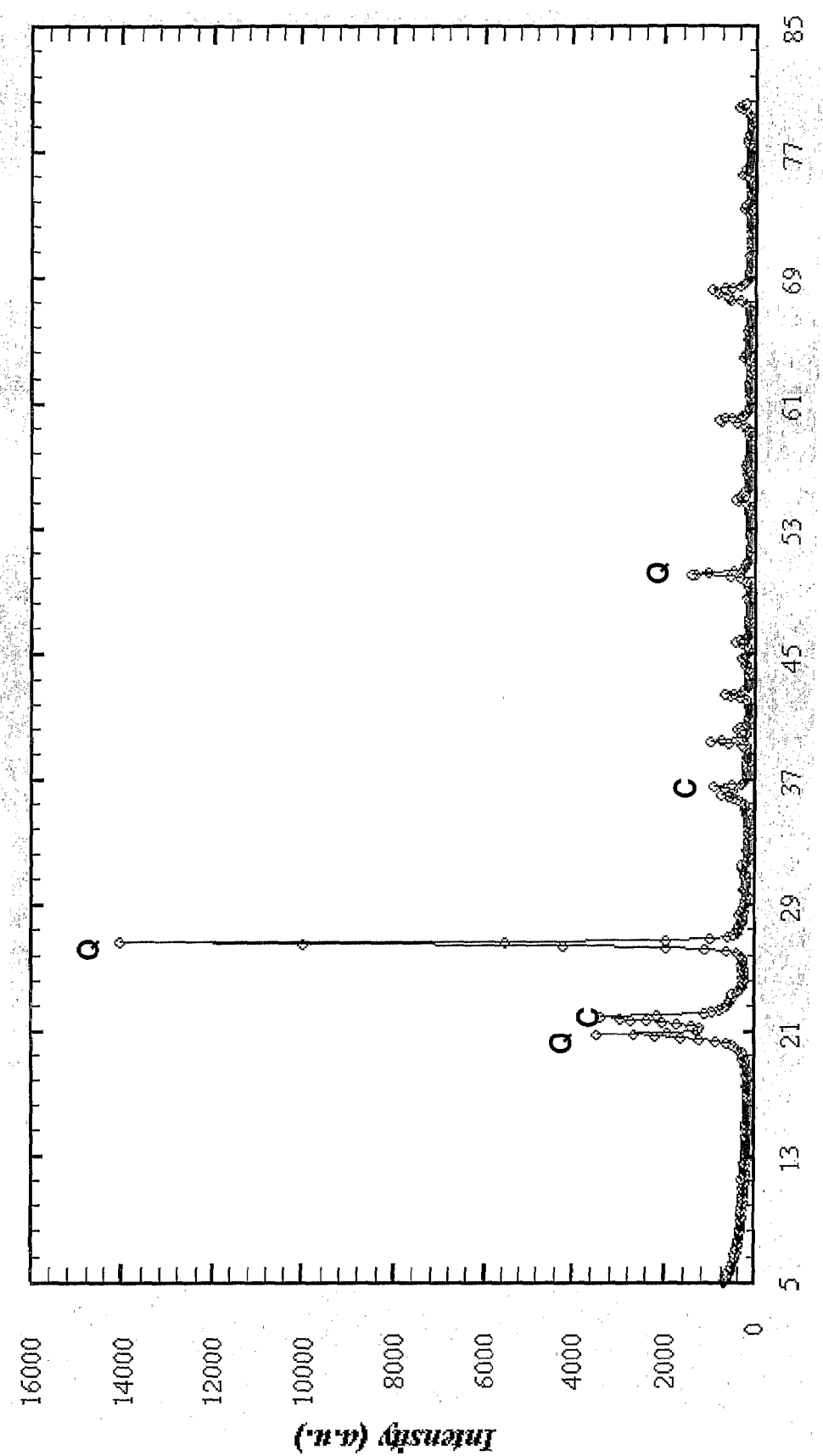
FIG. 6 shows an X-ray diffraction spectrum of the sample 3 from the ignimbrite deposit from FIG. 1. It can be distinguished the crystalline phases of quartz (Q) and cristobalite (C).
Figure 7:
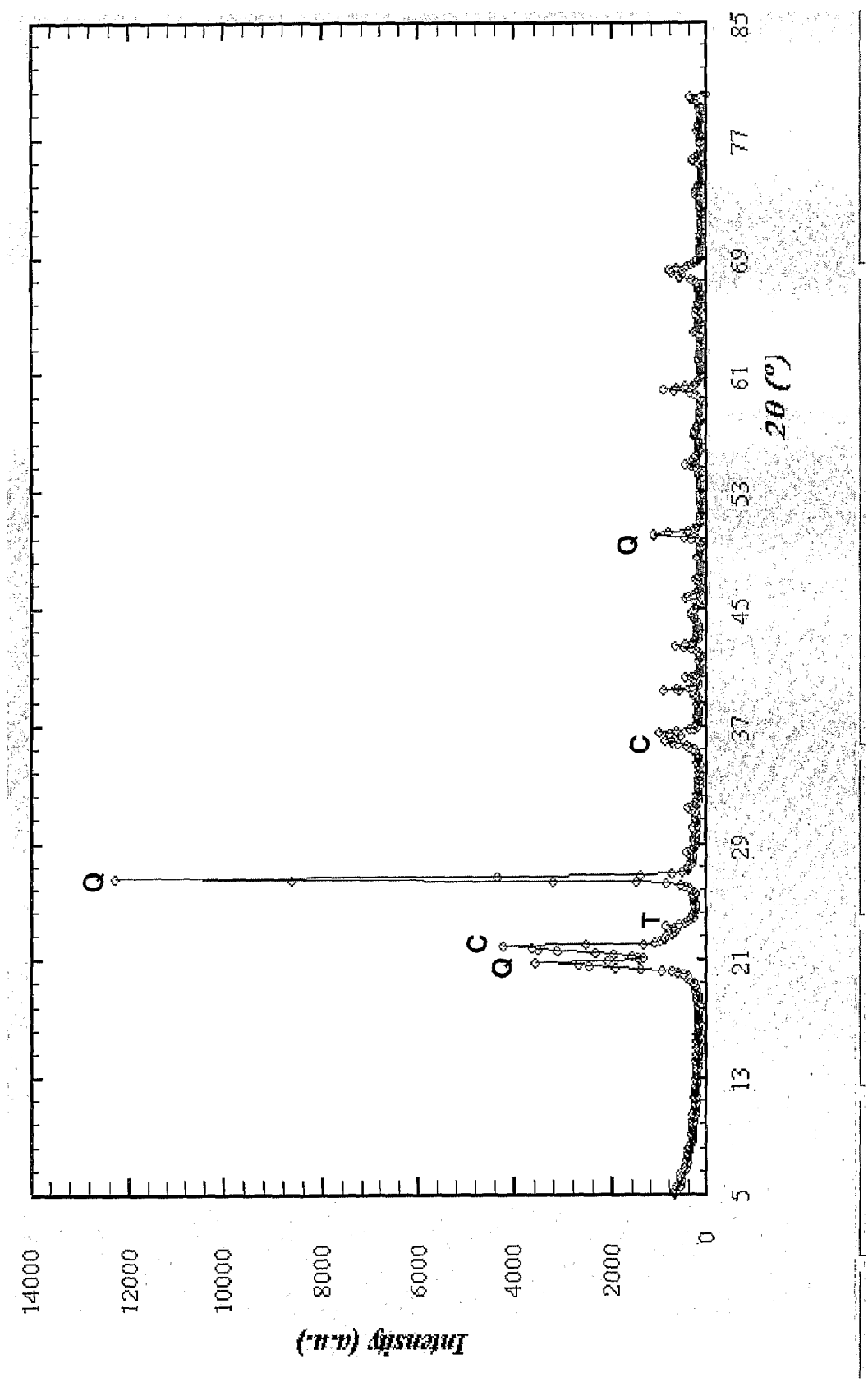
FIG. 7 shows an X-ray diffraction spectrum of the sample 4 from the ignimbrite deposit from FIG. 1. It can be distinguished the crystalline phases of quartz (Q), cristobalite (C) and tridimite (T).
Figure 8:
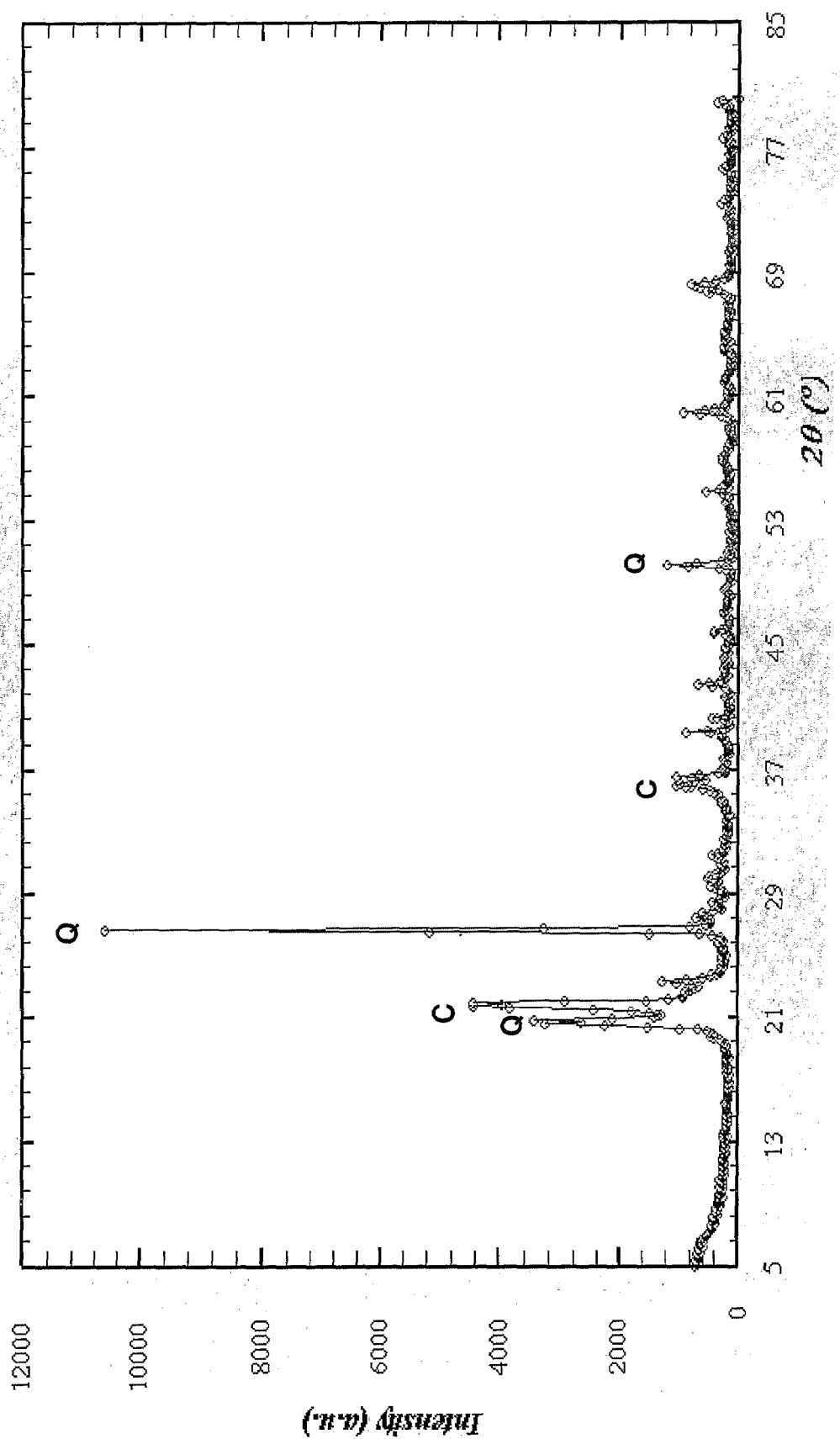
FIG. 8 shows an X-ray diffraction spectrum of the sample 6 from the ignimbrite deposit from FIG. 1. It can be distinguished the crystalline phases of quartz (Q) and cristobalite (C).
Figure 9:
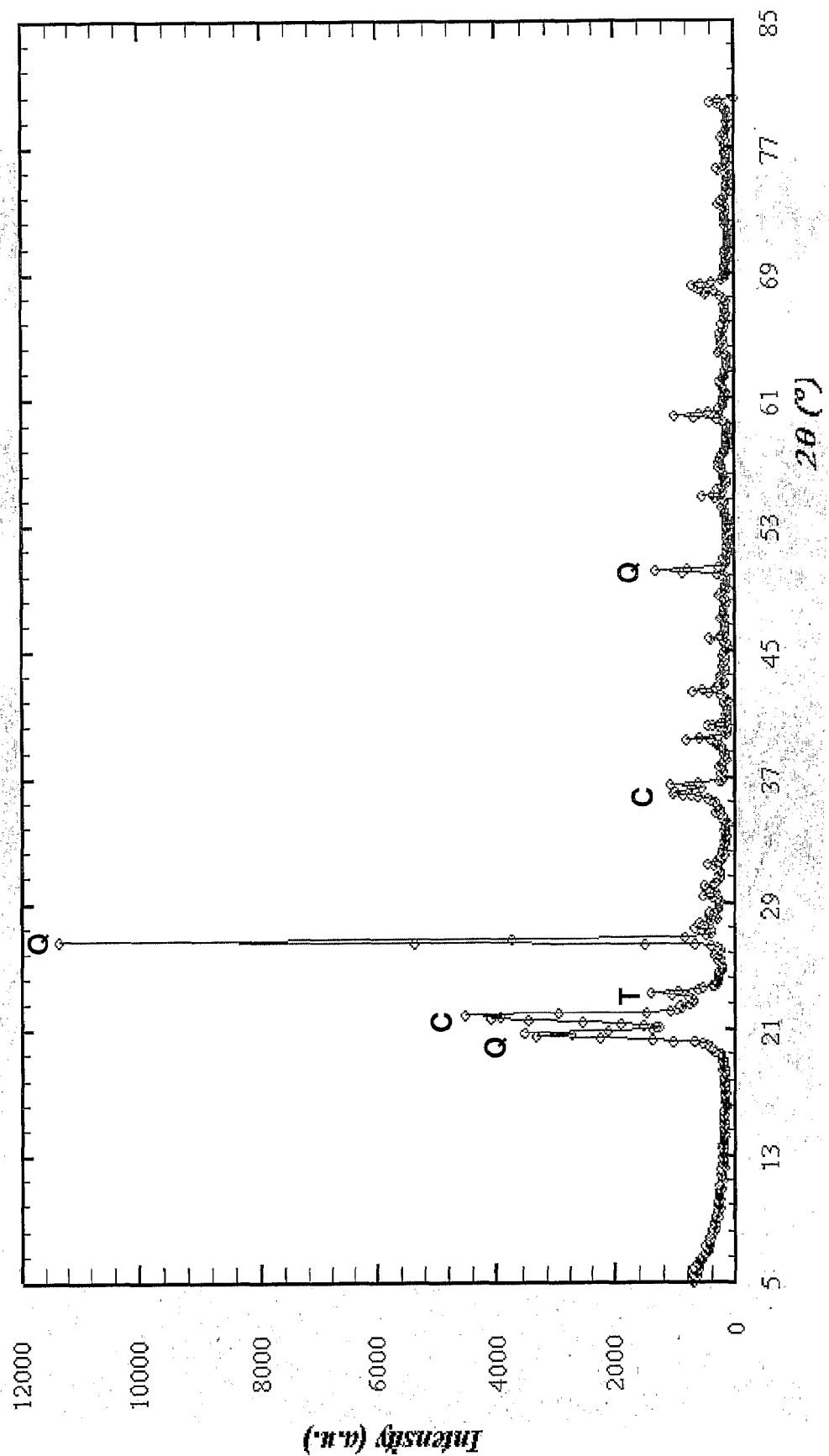
FIG. 9 shows an X-ray diffraction spectrum of the sample 7 from the ignimbrite deposit from FIG. 1. It can be distinguished the crystalline phases of quartz (Q), cristobalite (C) and tridimite (T).
Figure 10:
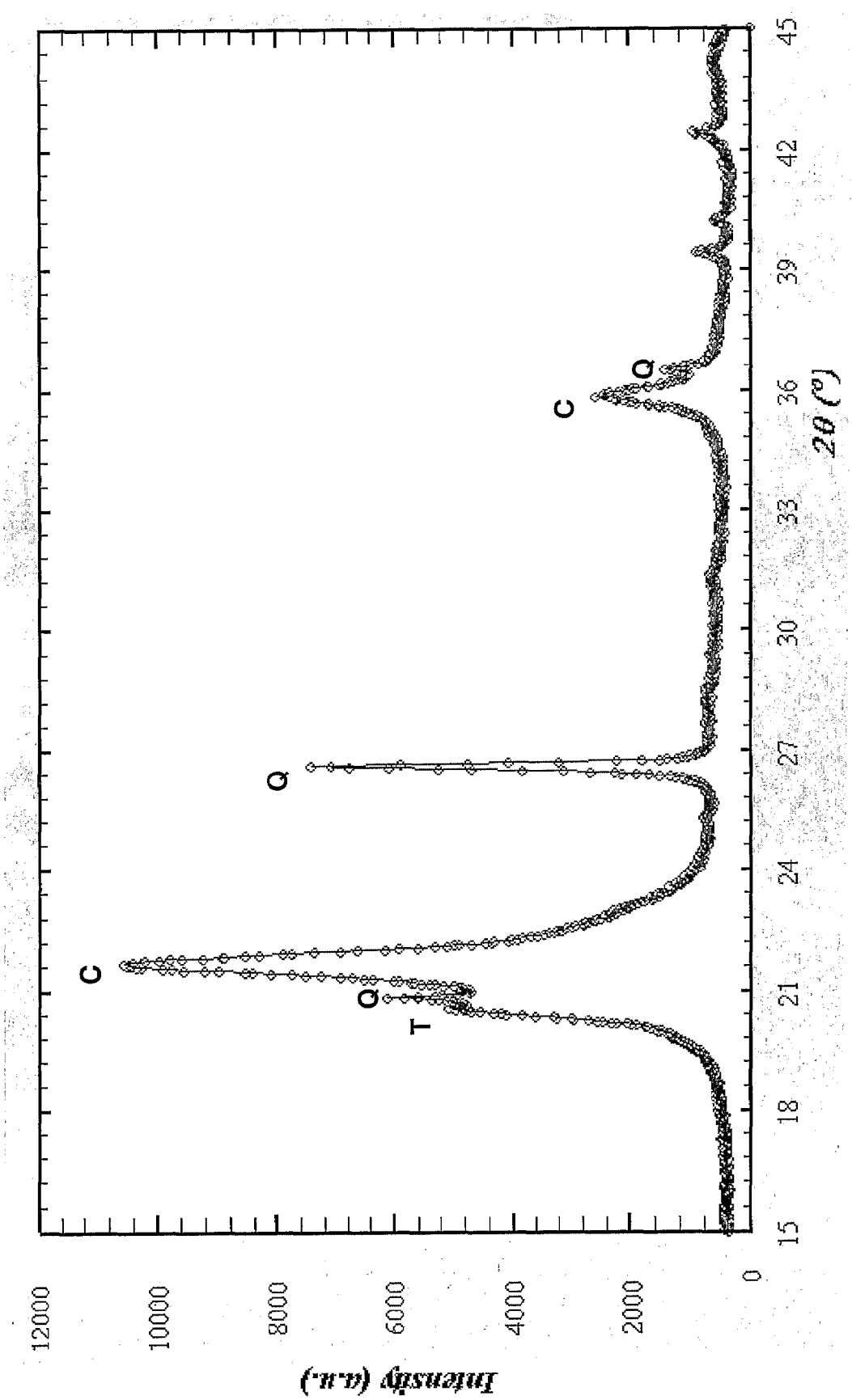
FIG. 10 shows an X-ray diffraction spectrum of the sample 8 from the ignimbrite deposit from FIG. 1. It can be distinguished the crystalline phases of quartz (Q), cristobalite (C) and tridimite (T).
Figure 11:
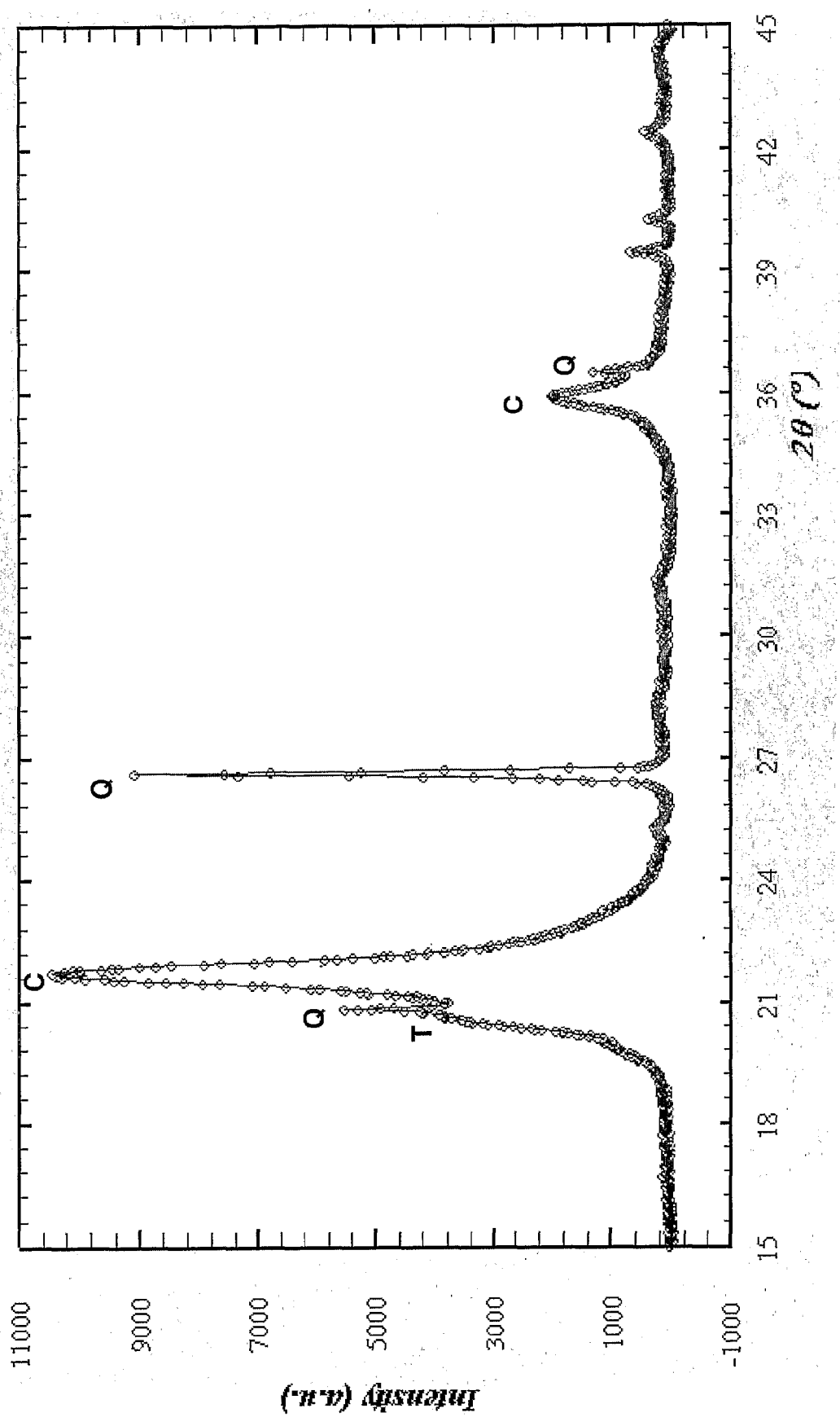
FIG. 11 shows an X-ray diffraction spectrum of the sample 10 from the ignimbrite deposit from FIG. 1. It can be distinguished the crystalline phases of quartz (Q), cristobalite (C) and tridimite (T).

As it can be observed in table 5 and FIG. 2, the great majority of cements with the proven pozzolanic materials, exhibited greater values of compressive strength at 28 days, as much in crude materials as calcined, with respect to the cement control and to the cement with silica fume (see FIG. 5). Also in all cases, the cement with crude pozzolanic material developed a smaller value of compressive strength that the calcined material.

TABLE 4

| Type of sample | Witness CP | Track Drill's large drills | | Diamond large drills | | Surface samples | | | | | |
|---|---|---|---|---|---|---|---|---|---|---|---|
| | | 1 | 2 | 3 | 4 | 5 | 6 | 7 | 8 | 9 | 10 |
| Crude | 3.1 | 2.59 | 2.33 | 2.46 | 2.43 | 2.40 | 2.40 | 2.43 | 2.24 | 2.23 | 2.26 |
| Calcined | — | 2.63 | 2.37 | 2.49 | 2.46 | 2.42 | 2.42 | 2.48 | 2.27 | 2.27 | 2.31 |

CP Portland cement.

On the other hand, the pozzolanic indexes for the materials of the invention are show in table 5 and FIG. 3. As it can be observed, all the pozzolanic materials of the invention without calcination exhibited pozzolanic indexes from 86 to 115%, whereas for calcined materials the resulting pozzolanic indexes were from 88 to 123% (see FIG. 3).

TABLE 5

| | | Samples | | | | | | | | | |
|---|---|---|---|---|---|---|---|---|---|---|---|
| | | Track drills's large drills | | Diamond large drills | | Surface samples | | | | | |
| Parameter | Type of sample | 1 | 2 | 3 | 4 | 5 | 6 | 7 | 8 | 9 | 10 |
| Pozzolanic index (%) | Crude | 86 | 96 | 95 | 93 | 110 | 103 | 104 | 114 | 110 | 115 |
| | Calcined | 88 | 107 | 107 | 102 | 113 | 113 | 119 | 123 | 121 | 122 |
| Compressive strength at 28 days (Kg/cm²) | Crude | 360 | 405 | 400 | 389 | 464 | 434 | 436 | 473 | 462 | 430 |
| | Calcined | 368 | 451 | 451 | 427 | 476 | 476 | 493 | 499 | 499 | 519 |

EXAMPLE 5

X-Ray Diffraction from Pozzolanic Material

The samples of pozzolanic material of example 2 were analyzed by x-ray diffraction. As it can be observed in FIG. 4 to FIG. 11, the samples with a density smaller to 2.4 g/cm³ showed a substantially greater amount of cristobalite and tridimite than those samples that exhibited densities greater to 2.4 g/cm³, where the amounts of cristobalite and tridimite were minimum or not exist, appearing solely quartz crystals (see sample 1 and FIG. 4).

Comparing the x-ray diffraction spectrum data from samples with densities smaller to 2.4 g/cm³ with the pozzolanic indexes of the calcined material of the invention (see FIG. 3), equal or greater values to 120% are observed, whereas to samples with densities greater to 2.4 g/cm³, the pozzolanic indexes reach 105% at the most.

On the other hand, by Rietveld method, the amount of cristobalite, tridimite and quartz was determined in 3 representative samples of the material extracted from the deposit, after obtaining the mentioned results previously, as well the crystallite size for each one of these crystalline phases.

Figure 12:
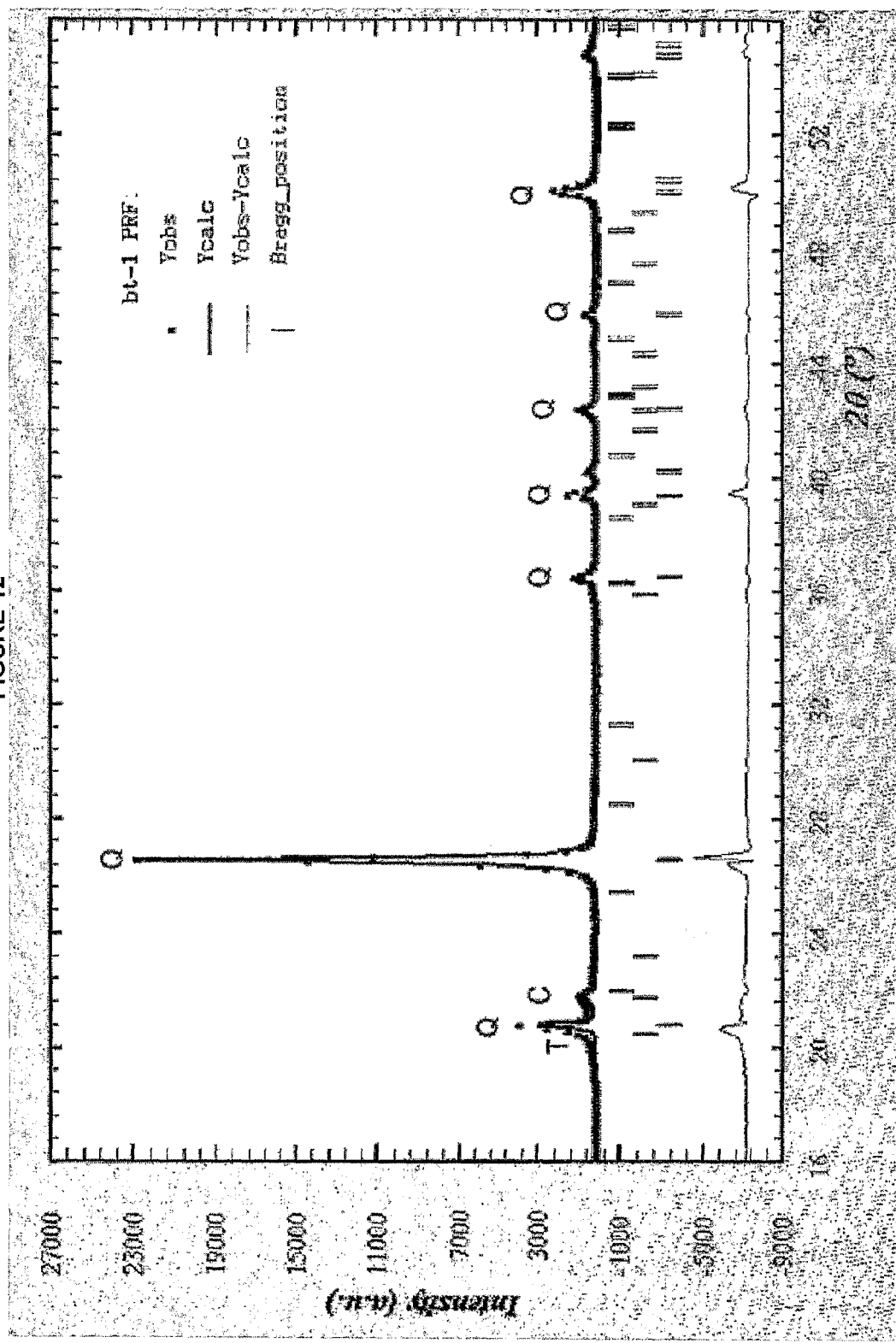
FIG. 12 shows an X-ray diffraction spectrum of a semi-quantitative determination of the sample 1 from the ignimbrite deposit from FIG. 1. It can be distinguished the crystalline phases of quartz (Q), cristobalite (C) and tridimite (T).
Figure 13:
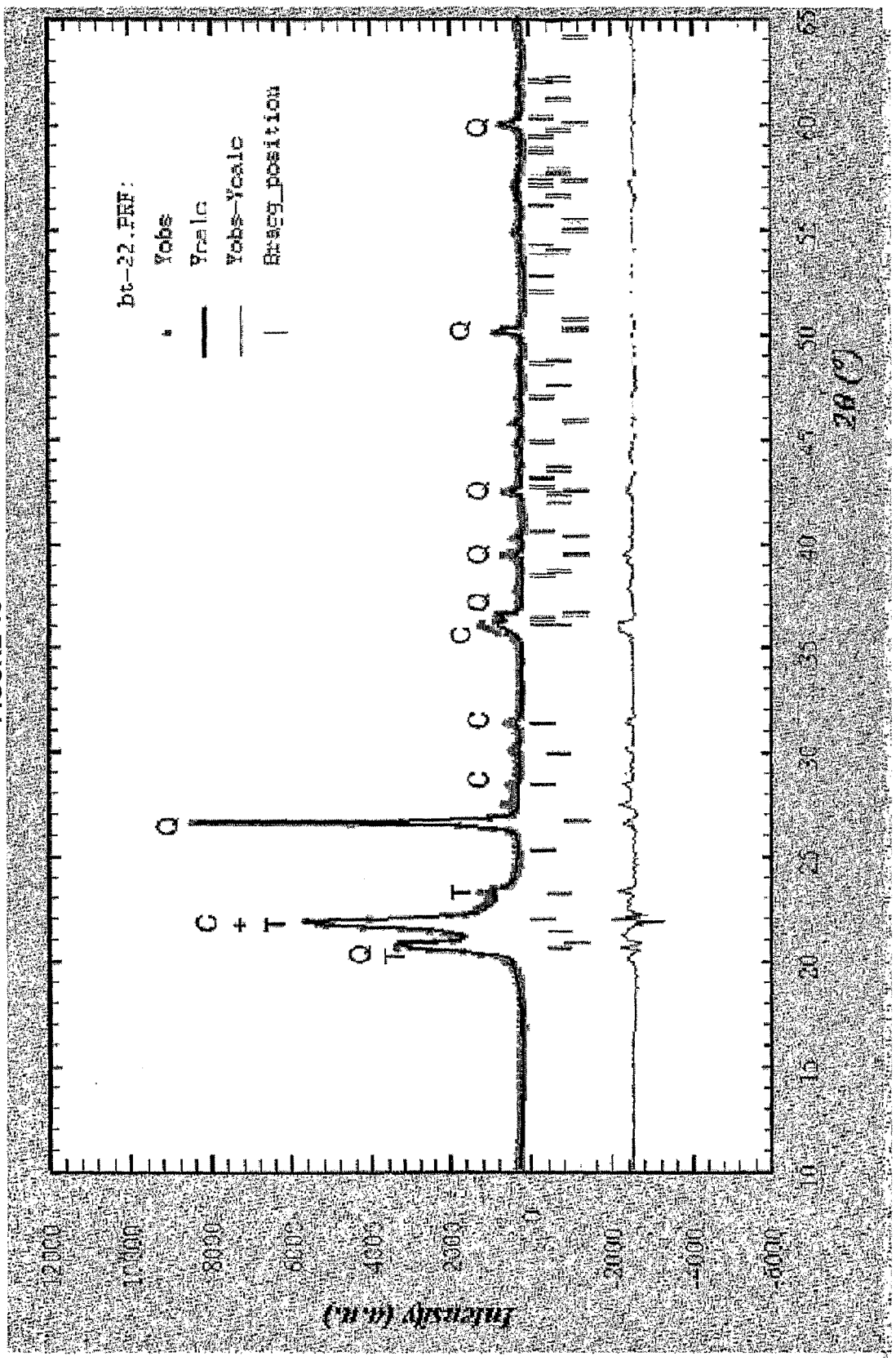
FIG. 13 shows an X-ray diffraction spectrum of a semi-quantitative determination of the sample 2 from the ignimbrite deposit from FIG. 1. It can be distinguished the crystalline phases of quartz (Q), cristobalite (C) and tridimite (T).
Figure 14:
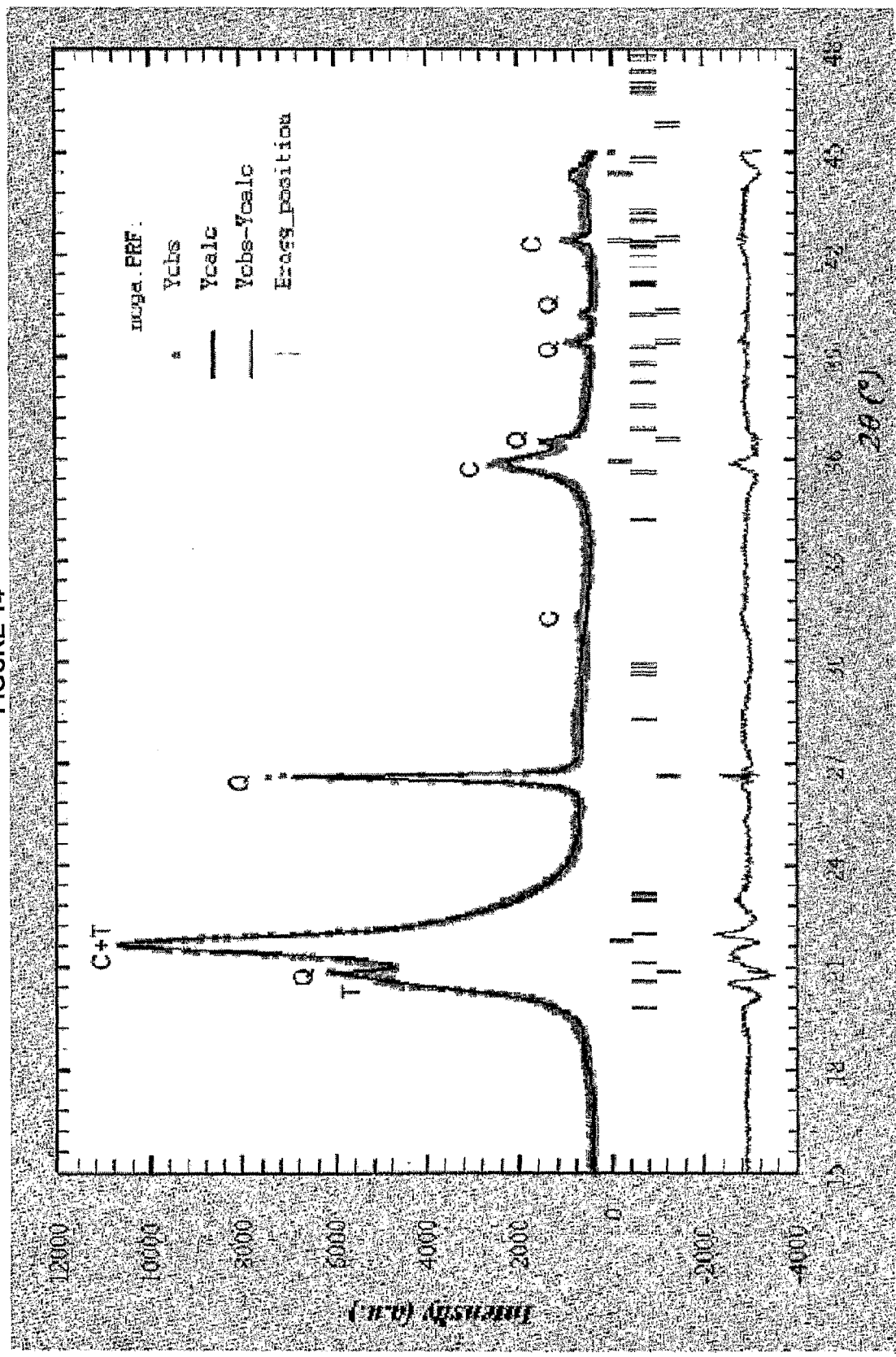
FIG. 14 shows an X-ray diffraction spectrum of a semi-quantitative determination of the sample 8 from the ignimbrite deposit from FIG. 1. It can be distinguished the crystalline phases of quartz (Q), cristobalite (C) and tridimite (T).

As it can be observed in table 6 and FIG. 12 to FIG. 14, the samples with densities smaller to 2.4 g/cm³ presented a percentage in weight of cristobalite and tridimite at least of 56% with respect to the total weight of silica and with a crystallite size equal or smaller to 12 nm.

The sample with a density greater to 2.4 g/cm³ exhibited a percentage in weight much greater of quartz than cristobalite and tridimite in the silica.

The table 6 also shows some of the differences in the performance like pozzolanic material of these materials; as it can be observed, the samples with a percentage in weight greater or equal to 56% of cristobalite and tridimite in the silica of the material present the best performance.

TABLE 6

| | SAMPLE 1 | | | SAMPLE 2 | | | SAMPLE 8 | | |
|---|---|---|---|---|---|---|---|---|---|
| | % in silica* | D.S. | Crystal (nm)** | % in silica* | D.S. | Crystal (nm)** | % in silica* | D.S. | Crystal (nm)** |
| CRYSTALLINE PHASE | | | | | | | | | |
| Cristobalite | 5 | 1 | 10 | 27 | 2 | 10 | 43 | 1 | 9 |
| Tridimite | 4 | 1 | 14 | 29 | 2 | 12 | 34 | 2 | 6 |
| Quartz | 91 | 5 | ∞ | 44 | 2 | ∞ | 23 | 0.5 | ∞ |
| Total | 100 | | | 100 | | | 100 | | |
| PARAMETER | | | | | | | | | |
| Density (g/cm³)+ | | 2.63 | | | 2.37 | | | 2.27 | |
| Pozzolanic index (%)+ | | 88 | | | 107 | | | 123 | |

TABLE 6-continued

| | SAMPLE 1 | | | SAMPLE 2 | | | SAMPLE 8 | | |
|---|---|---|---|---|---|---|---|---|---|
| | % in silica* | D.S. | Crystal (nm)** | % in silica* | D.S. | Crystal (nm)** | % in silica* | D.S. | Crystal (nm)** |
| Compressive strength at 28 days (Kg/cm$^2$)+ | | 368 | | | 451 | | | 500 | |

*Percentage in weight.
**Crystallite size.
+Measured in calcined samples.

EXAMPLE 6

Composition and Particle Size of the Pozzolanic Material of the Invention

The pozzolanic material with a density smaller to 2.4 g/cm$^3$ was analyzed in its particle size and its chemical composition using conventional methods, after being processed at industrial level as it indicates the example 1. The obtained pozzolanic material has a particle size of 40 μm at 98% (see table 7), a percentage of silica near to 90% and a density of 2.33 g/cm$^3$ (see table 8). Also, the pozzolanic index of the material is greater to 120% (see table 9).

TABLE 7

| Particle size (μm) | Distribution |
|---|---|
| 1 | 2.5 |
| 2 | 7 |
| 5 | 25 |
| 10 | 50 |
| 15 | 65 |
| 20 | 79 |
| 40 | 98 |
| 50 | 100 |
| 100 | 100 |

TABLE 8

| | Component | Quantity | Method |
|---|---|---|---|
| Chemical analysis | SiO$_2$ [%] | 89.08 | ASTM-C114 |
| | Al$_2$O$_3$ [%] | 1.87 | ASTM-C114 |
| | Fe$_2$O$_3$ [%] | 0.1 | ASTM-C114 |
| | CaO [%] | 3.96 | ASTM-C114 |
| | MgO [%] | 0.88 | ASTM-C114 |
| | K$_2$O [%] | 0.06 | ASTM-C114 |
| | Na$_2$O [%] | 0 | ASTM-C114 |
| | SO$_3$ [%] | 0.35 | ASTM-C114 |
| | PPI [%] | 2.22 | ASTM-C114 |
| Physical tests | Density (g/cm$^3$) | 2.3301 | Picnometer |
| | Blaine (g/cm$^2$) | 6536 | ASTM-C204 |
| | Mesh 325 (%) | 96.7 | ASTM-C114 |

TABLE 9

| | Compressive strength (Kg/cm$^2$) | | |
|---|---|---|---|
| Time | Control | Mix 20% | Method |
| 24 hrs | 135.95 | 107.85 | ASTM-C311 |
| 3 days | 253.55 | 227.11 | ASTM-C311 |
| 7 days | 303.53 | 291.13 | ASTM-C311 |
| 28 days | 391.91 | 483.34 | ASTM-C311 |
| Pozzolanic index 28 days | | 123% | ASTM-C311 |

EXAMPLE 7

Preparation of Mixtures with the Pozzolanic Material for Resistance and Durability Tests All necessary concretes to evaluate the characteristics of the pozzolanic material of the invention according to examples 8 to 14, were elaborated with coating of 10+/−1 cm and with a water-cement relation from 0.50 to 0.55. Also the average air content in the concrete was 5%, obtained with the additive MBVR; finally was used the reducing water additive Rheobuild 1000, both additives from the Masters Builders Technology Company.

EXAMPLE 8

Compressive Strength of Mixtures of Cement and the Microsilica of the Invention

The pozzolanic material of example 6 was mixed with Portland cement in different proportions and compared with similar mixtures but with silica fume like comparison material according to ASTM C-192. As it can be observed in FIG. 15, the mixtures containing the material of the invention develop similar compressive strength values at 28 days to the obtained for mixtures containing silica fume in the same proportions. In anyone of the proportions of the material of the invention under test, superior values of compressive strength were obtained in reference to the sample control.

EXAMPLE 9

Resistance to the Flexion

The pozzolanic material of the invention was mixed with sand and Portland cement in diverse proportions to obtain concrete mortar mixtures according to ASTM C-192 The mixtures containing the pozzolanic material, developed greater values of flexion resistance at 28 days in comparison with mixtures containing silica fume in the same proportions, as well as with a control (see FIG. 16). The values of flexion resistance in mixtures with 5 to 15% of the pozzolanic material were very similar to each other.

EXAMPLE 10

Resistance to the Abrasion

Diverse mixtures of concrete were obtained according to ASTM C-192 altogether with different proportions of pozzolanic material. As it is observed in FIG. 17, the mixtures containing the pozzolanic material exhibited a smaller loss of weight in all cases, in comparison with mixtures containing silica fume and concrete 300 like the control. The most surprising effect was observed in the proportion at 10%, where the loss of weight value of the mixture was 58% minor to the observed for the mixture with the same proportion of silica fume.

EXAMPLE 11

Resistance to Chlorine Ions Penetration

Like the examples 8 to 10, a concrete mixture containing the pozzolanic material of the invention was prepared according to ASTM C-1202, in comparison with Portland cement and a mixture elaborated with silica fume. At the end of the test, the tried samples developed the electrical charge values observed in FIG. 18. As it can be observed, the mixture with the pozzolanic material developed a value near to 1,000 coulombs, which allows to classified the mixture with very low permeability; also, this value was near to the reached value of mixture with silica fume (near to 500 coulombs, very low permeability) and a 55% minor to the observed for the ordinary cement (with moderate permeability).

EXAMPLE 12

Resistance to Sulphate Attack

Mortar mixtures with the pozzolanic material were tried according to ASTM C-1012. The samples containing the pozzolanic material exhibited a very low expansion percentage during the test, even until at 28 weeks, independently of the used percentage of pozzolanic material (see FIG. 19). Portland cement T-2 used as a control, reported a value 97% greater than the observed for samples with the pozzolanic material at 28 weeks.

EXAMPLE 13

Potential Resistance to Alkali Aggregate Reactivity

Mortar mixtures with pozzolanic material were tried under conditions according to ASTM C-227. As it can be observed in FIG. 20, the mixtures with percentage from 10 to 20% of pozzolanic material conserved an expansion value smaller to 0.01% during the test, whereas the sample with 5% reached a value of 0.03% at 6 months. Nevertheless, all the previous values were 90% lower in all ages compared with the observed values for the control.

EXAMPLE 14

Resistance to Attack by Alkali Aggregate Reactivity with Diverse Pozzolanic Materials Diverse samples were prepared containing diverse pozzolanic materials, as well as the material of the invention according to ASTM 1260. The mixtures containing the pozzolanic material of the invention in a percentage from 15 to 20%, reached values near or smaller to the 0.1%, which were similar to reached by the mixture containing 25% of flying ashes type-F. In all cases, the pozzolanic material of the invention provided to the mixtures under test, percentages of expansion 60% lower compared with the obtained percentages for low alkali Portland cement (see FIG. 21).

EXAMPLE 15

Comparative Physical and Chemical Characteristics of Material of the Invention Like for the microsilica described here, samples of high performance silica fume and microsilica 600 were put under analytical determinations of some of its physical parameters under the same experimental conditions. As it is observed in table 10, the microsilica of the invention exhibits similar characteristics of performance to the high performance silica fume, but with superior pozzolanic indexes to this one. Also, the pozzolanic indexes of the material of the invention are superior to the observed for microsilica 600.

TABLE 10

| Parameter | Microsilica of the invention | Silica fume | Microsilica 600 | Cement |
|---|---|---|---|---|
| $SiO_2$ (%) | 88-93 | 85-97 | 87-89 | 20-25 |
| Surface area (BET) ($m^2$/Kg) | 25,000 | 17,000-30,000 | N.D. | 300-400* |
| Pozzolanic Index (%) | 120-125 | 120-140 | 119 | N.A. |
| Pozzolanic activity with lime (psi) | 1,279-1,777 | 1,200-1,660 | N.D. | N.A. |

*Permeability to air.
N.A. Not apply.
N.D. No determined.

REFERENCES

1. Greenwood, Peter. 2003. Mixture of silica sols. U.S. Pat. No. 6,596,250.
2. VassOy, BjOrn. 1990. Procedure for the admixture of silicon oxide to a hydraulic cement slurry. PCT/NO90/00063.
3. Reddy, Baireddy R. 2002. Early-enhanced strength cement compositions and methods. U.S. Pat. No. 6,478,868
4. De Marco, Tiziana. 2002. Inorganic cohesion agent for self-compacting cement pastes. Pat. EP1176124.
5. Bergqvist, Hans. 1998. A method for preparation of a hardening composition. PCT/SE97/01350.
6. Newell, W. J. 1964. Cement plaster. U.S. Pat. No. 3,135,617.
7. Jaques, Stephen B. 1996. Processed silica as a natural pozzolan for use as a cementitious component in concrete and concrete products. U.S. Pat. No. 5,554,352.
8. Biagini, Stefano. 1998. Pozzolanic compositions. U.S. Pat. No. 5,762,701.
9. Berardi, Roberto. 2002. Method of making cement from tailing or rock fines containing silicate or siliceous compounds. USPat2002/0033120.
10. Dastol, Magne. 2002. Method for production of white microsilica. USPat 2002/0025287.
11. Gutierrez, Ricardo. 2004. A stable aqueous dispersion of microsilica. PCT/US2003/021407.
12. Yamamoto, Kunio. 2000. Microsilica with a closely controlled bulk density, method and apparatus for production thereof. PCT/NO00/00058.
13. Lane, Donald R. 1991. Aqueous dispersion of microsilica having a delayed thixotropic reaction. U.S. Pat. No. 5,028,267.

14. Kinose, Yutaka. 2002. Fine spherical silica and liquid sealing resin composition containing same. U.S. Pat. No. 6,395,807.
15. Scheiner, Paul C. 1987. Microsilica slurries and method of preparation. Pat. EP0246181.
16. Bainton, John W. 1976. Addition of acidulated pozzolan to concrete and concrete products. U.S. Pat. No. 3,953,222.
17. Johnston, James Howard. 1994. Amorphous silica, its preparation and uses. PCT/NZ94/00004.
18. Microsilica 600 Guide. Shotcrete. A natural pozzolan for high performance concrete. 2004.
19. Dingsoyr, Eldar. 1997. Method for treatment of silicon dioxide containing material. PCT/NO97/00088.
20. Eriksson, Bo-Erik. 1991. Process for producing an active fine aggregate for the preparation of concrete. PCT/FI90/00250.
21. Morsanyu, Anna Victoria. 1971. Improvements in or relating to high temperature mortars. Pat. GB1225629.
22. Jones, William David. 1952. Improvements in or relating to silica bricks. Pat GB 674240.
23. Prosilis. 1953. Method of manufacture of cristobalite. Pat. GB686876.
24. Vsevolod P. Kirilishin. 1980. Binder for chemically resistant concrete and process for producing this binder. U.S. Pat. No. 4,234,347.
25. Darlogeanu, Constantin. 1989. Procede d' obtention des briques silica a teneur reduite de quartz residuel. Pat. RO96824.

The invention claimed is:

1. A microsilica with pozzolanic activity that comprises silica containing 55 to 90% in weight of cristobalite and tridimite with respect to the total weight of silica, wherein said microsilica has a particle size distribution equal to or less than 40 μm at 98%, wherein said microsilica includes:

| Components | Percentage in weight with respect to the total weight of microsilica (%) |
| --- | --- |
| $SiO_2$ | 89.08 |
| $Al_2O_3$ | 1.87 |
| $Fe_2O_3$ | 0.1 |
| CaO | 3.96 |
| MgO | 0.88 |
| $K_2O$ | 0.06 |
| $SO_3$ | 0.35. |

2. The microsilica of the claim 1, wherein said microsilica has a density of 2.33 $g/cm^3$, a mesh fineness of 325 in a 96.7% and a Blaine value of 6,536 $g/cm^2$.

3. A method for the production of a microsilica with pozzolanic activity that contains at least 85% in weight of silica with respect to the total weight of microsilica, wherein the silica contains 55 to 90% in weight of cristobalite and tridimite with respect to the total weight of silica, wherein said microsilica has a particle size distribution equal to or less than 40 μm at 98%, wherein the method includes the steps of:
   a) Obtaining siliceous material from a natural deposit,
   b) Selecting any parts of the deposit that contain $SiO_2$ in an amount equal to or greater than 85% in weight with respect to the total weight of the material,
   c) Selecting any parts with a density lower than 2.4 $g/cm^3$ from the parts selected in step b),
   d) Crushing the parts selected in step c) until a particle size lower than ½" is obtained,
   e) Calcination of the material resulting from step d) at 590 to 620° C., and
   f) Milling the calcined material until a mesh particle size of 325 at 96% minimum is obtained.

4. The method of claim 3, wherein the natural deposit is an ignimbrite deposit.

5. The method of claim 4, wherein the microsilica has a pozzolanic index from 100 to 125%.

6. The method of claim 5, wherein the microsilica has a pozzolanic index from 115% to 125%.

7. A method for the production of a microsilica with pozzolanic activity that contains at least 85% in weight of silica with respect to the total weight of microsilica, wherein the silica contains 55 to 90% in weight of cristobalite and tridimite with respect to the total weight of silica, wherein said microsilica has a particle size distribution equal to or less than 40 μm at 98%, wherein the method includes the steps of:
   a) Obtaining siliceous material from a natural deposit,
   b) Selecting any parts of the deposit that contain $SiO_2$ in an equal or greater amounts than 85% in weight with respect to the total weight of the material,
   c) Selecting any parts with a density lower than 2.4 $g/cm^3$ from the parts selected in step b),
   d) Crushing the parts selected in step c) until a particle size lower than ½" is obtained, and
   e) Milling the material obtained in step d) until a mesh particle size of 325 at 96% minimum is obtained.

8. The method of claim 7, wherein the natural deposit is an ignimbrite deposit.

9. The method of claim 8, wherein the microsilica has a pozzolanic index from 100 to 120%.

* * * * *